US010373384B2

(12) United States Patent
Overbeck

(10) Patent No.: US 10,373,384 B2
(45) Date of Patent: Aug. 6, 2019

(54) LIGHTFIELD COMPRESSION USING DISPARITY PREDICTED REPLACEMENT

(71) Applicant: Google Inc., Mountain View, CA (US)

(72) Inventor: Ryan Overbeck, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 34 days.

(21) Appl. No.: 15/376,083

(22) Filed: Dec. 12, 2016

(65) Prior Publication Data
US 2018/0165880 A1    Jun. 14, 2018

(51) Int. Cl.
| | |
|---|---|
| *G06T 1/60* | (2006.01) |
| *G06T 7/00* | (2017.01) |
| *G06T 7/20* | (2017.01) |
| *G06T 7/70* | (2017.01) |
| *G06T 11/00* | (2006.01) |
| *G06T 19/00* | (2011.01) |
| *H04N 19/17* | (2014.01) |
| *H04N 19/139* | (2014.01) |
| *H04N 19/426* | (2014.01) |
| *H04N 19/507* | (2014.01) |
| *H04N 19/597* | (2014.01) |

(52) U.S. Cl.
CPC ............ *G06T 19/006* (2013.01); *G06T 1/60* (2013.01); *G06T 7/0002* (2013.01); *G06T 7/20* (2013.01); *G06T 7/70* (2017.01); *G06T 11/003* (2013.01); *H04N 19/139* (2014.11); *H04N 19/17* (2014.11); *H04N 19/426* (2014.11); *H04N 19/507* (2014.11); *H04N 19/597* (2014.11)

(58) Field of Classification Search
CPC ....... G06T 19/006; G06T 7/20; G06T 7/0002; G06T 7/70; G06T 1/60; G06T 11/003; H04N 19/426; H04N 19/17; H04N 19/139

See application file for complete search history.

(56) References Cited

U.S. PATENT DOCUMENTS

| | | | |
|---|---|---|---|
| 6,097,394 A * | 8/2000 | Levoy ................ | G02B 27/2271 345/419 |
| 6,476,805 B1 * | 11/2002 | Shum ....................... | G06T 7/97 345/420 |
| 6,693,964 B1 | 2/2004 | Zhang et al. | |
| 8,155,456 B2 | 4/2012 | Babacan et al. | |

(Continued)

OTHER PUBLICATIONS

Ahrenberg et al. "Light Field Rendering using Matrix Optics" WSCG'2006, Jan. 30-Feb. 3, 2006.*

(Continued)

*Primary Examiner* — Samantha (Yuehan) Wang
*Assistant Examiner* — Khoa Vu

(57) ABSTRACT

A display system includes a first storage device to store a first lightfield and a second storage device to store a second lightfield. The first lightfield comprises a two-dimensional array of images, with each image comprising a corresponding two-dimensional array of image tiles, and the second lightfield comprises a compressed representation of the first lightfield. The system further includes at least one processor configured to selectively eliminate image tiles of images of the first lightfield from inclusion in the second lightfield based on identified redundancies between the eliminated image tiles and image tiles in the same tile positions of other images of the lightfield.

26 Claims, 15 Drawing Sheets

(56) References Cited

U.S. PATENT DOCUMENTS

| | | | |
|---|---|---|---|
| 9,900,510 B1* | 2/2018 | Karafin | H04N 5/23267 |
| 2003/0055833 A1* | 3/2003 | Chan | G06F 17/30017 |
| 2004/0125103 A1* | 7/2004 | Kaufman | G06T 15/06 |
| | | | 345/419 |
| 2007/0122042 A1 | 5/2007 | Lelescu et al. | |
| 2012/0294374 A1 | 11/2012 | Said | |
| 2013/0039422 A1* | 2/2013 | Kirchhoffer | H04N 19/52 |
| | | | 375/240.13 |
| 2013/0242051 A1 | 9/2013 | Balogh | |
| 2015/0201176 A1 | 7/2015 | Graziosi et al. | |
| 2016/0021355 A1 | 1/2016 | Alpaslan et al. | |
| 2016/0270656 A1* | 9/2016 | Samec | A61B 3/085 |

OTHER PUBLICATIONS

Ramanathan et al. "Rate-Distortion Optimized Interactive Ligh Field Streaming" IEEE Vol. 9, No. 4, Jun. 2007.*

Girod, B. and Flierl, M., "Multi-Frame Motion-Compensated Video Compression for the Digital Set-Top Box", ICIP, Sep. 2002, 4 pages.

Koga, T., et al., "Motion-Compensated Adaptive Intra-Interframe Predictive Coding Algorithm", NEC Corporation, C&G Systems Research Labs, 1985, pp. 363-366.

Kum, S. and Mayer-Patel, K., "Intra-Stream Encoding for Multiple Depth Streams", NOSSDAV, 2006, 6 pages.

Levoy, M. and Hanrahan, P., "Light Field Rendering", Proc. ACM SIGGRAPH, Jul. 1996, 12 pages.

Lukacs, M., "Predictive Coding of Multi-Viewpoint Image Sets", Bell Communications Research, NVC-3x-330, 1986, pp. 521-524.

Ramanathan, P., et al., "Multi-Hypothesis Prediction for Disparity-Compensated Light Field Compression", Dec. 2001, 4 pages.

Van Waveren, J.M.P. and Castano, I., "Real-Time YCoCg-DXT Compression", Sep. 14, 2007, 53 pages.

Zhang, C. and Li, J., "Compression of Lumigraph with Multiple Reference Frame (MRF) Prediction and Just-in-time Rendering", IEEE, 2000, pp. 253-262.

International Search Report and Written Opinion dated Dec. 6, 2017 for corresponding International Application No. PCT/US2017/053620, 17 pages.

Written Opinion of the International Preliminary Examining Authority dated Jul. 31, 2018 for corresponding International Application No. PCT/US2017/053620, 5 pages.

Chai, Jin-Xiang et al., "Plenoptic Sampling", Proceedings of the 27th Annual Conference on Computer Graphics and Interactive Techniques, ACM Press/Addison-Wesley Publishing Co., Jul. 2000; pp. 307-318.

Debevec, P. et al., "Efficient View-Dependent Image-Based Rendering with Projective Texture-Mapping", Rendering Techniques '98; Springer, Vienna, Jan. 1998; pp. 105-116.

Hedman, P. et al., "Scalable Inside-Out Image-Based Rendering", ACM Transactions on Graphics (TOG) 35, No. 6; Nov. 11, 2016; 11 pages.

Kang, Je-won et al., "Coding Order Decision of B Frames for Rate-Distortion Performance Improvement in Single-View Video and Multiview Video Coding", IEEE Transactions on Image Processing vol. 19, No. 8; Aug. 1, 2010, pp. 2029-2041.

Lin, Z. et al., "A Geometric Analysis of Light Field Rendering", International Journal of Computer Vision 58; No. 2; Jul. 1, 2004; pp. 121-138.

Magnor, M. et al., "Adaptive Block-based Light Field Coding", Telecommunications Laboratory, University of Erlangen-Nuremberg; Proc. International Workshop on Synthetic-Natural Hybrid Coding and 3-D Imaging (IWSNHC3DI'99); Sep. 1999; pp. 140-143.

Olano, M. et al., "Variable Bit Rate GPU Texture Decompression", Computer Graphics Forum, vol. 30, No. 4; Oxford, UK: Blackwell Publishing Ltd., Jun. 2011; pp. 1299-1308.

Wiegand, T. et al., "Overview of the H.264/AVC Video Coding Standard", IEEE Transactions on Circuits and Systems for Video Technology, Institute of Electrical and Electronics Engineers, USA; vol. 13, No. 7; Jul. 1, 2003; pp. 560-576.

International Preliminary Report on Patentability dated Feb. 25, 2019 for corresponding International Application No. PCT/US2017/053620, 10 pages.

Merkle, R. et al. "Efficient Prediction Structures for Multiview Video Coding", IEEE Transactions on Circuits and Systems for Video Technology, Institute of Electrical and Electronics Engineers, USA; vol. 17, No. 11; Nov. 1, 2007; pp. 1461-1473.

* cited by examiner

LIGHTFIELD COMPRESSION USING DISPARITY PREDICTED REPLACEMENT

BACKGROUND

Virtual reality (VR) and augmented reality (AR) applications often seek to enable a user to move throughout a scene (virtual or real-world) and enable the user to view the scene from the current pose of the user's head mounted device (HMD) or other VR/AR viewing device. Lightfields have been proposed as a light content format to enable rendering of imagery of a scene from many different views. However, lightfields suitable for realistic depiction can require many gigabytes of storage, often making their transmission, storage, and processing impracticable for many real-world implementations. The amount of resources required for use of lightfields for VR and AR applications often is particularly problematic for mobile consumer devices due to their relatively limited storage, transmission, and processing resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving the compression and decompression of a lightfield. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

Figure 1:
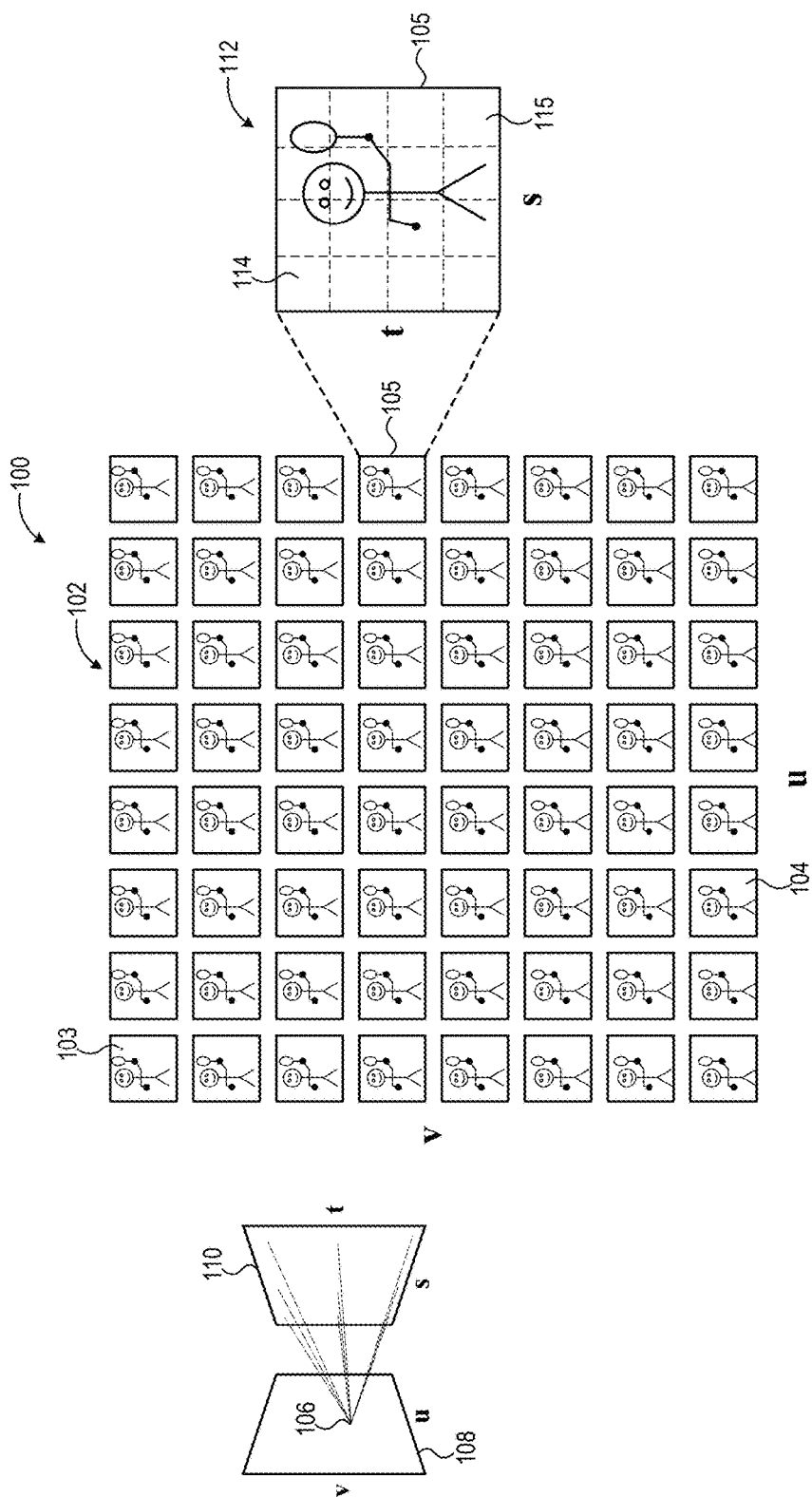
FIG. 1 is a diagram of an example lightfield structure in accordance with some embodiments.

FIG. 1 illustrates a typical two-plane representation of a lightfield in accordance with some embodiments. A lightfield (also known as a lumigraph, or photic field) may be conceptualized as the amount of light flowing in every direction through every point in a defined space or environment, wherein the direction of each ray in the lightfield is specified by a five-dimensional plenoptic function and the magnitude of each ray is specified by a corresponding radiance. A common approach to parameterizing a lightfield for computer-graphics implementations is via a two-plane parameterization, in which a lightfield is represented as collection of perspective images of an st plane (often referred to as the "focal plane"), with each image representing the perspective of a virtual camera from a corresponding position on a uv plane ("often referred to as the "camera plane") that is parallel to the st plane.

To illustrate, FIG. 1 depicts an example lightfield 100 that is composed of a two-dimensional (2D) array 102 of images (e.g., images 103, 104, 105), wherein each image of the array 102 represents the rays arriving at a corresponding point (e.g., point 106) on a uv plane 108 (having dimensions u and v) from all points on an st plane 110 (having dimensions s and t). In such implementations, the images of the array 102 represent off-axis, or sheared, perspective views of a scene or environment. Thus, the 2D array 102 may be represented as an array of images, with each image i having a position in the array defined by the coordinate ($u_i$, $v_i$). Further, each image is represented by a 2D array of pixels, and as shown by the example expanded view 112 of image 105, each pixel k of an image i has a position in the image defined by the coordinate ($s_k$, $t_k$). Further, for purposes of the DPR compression and DPR decompression processes described below, the array of pixels of an image may be conceived as an array of image tiles, with each image tile representing a corresponding pixel region and having a tile position ($s_i$, $t_i$). To illustrate with reference to image 105, each image is composed of, for example, a 4×4 array of tiles (e.g., tiles 114, 115).

Thus, as shown by lightfield 100 of FIG. 1, a lightfield may be represented by an array of images of a scene, with each image representing a slightly planar-shifted perspective of the scene relative to the perspectives of the other images of the lightfield. Often, a lightfield contains a relatively large number of such images, and these images are rendered or captured in relatively high resolution. As a result, the data structure representing a lightfield of suitable resolution and dimensionality can often reach a size in the tens of gigabytes or more. The sheer size of the data needed to represent a lightfield can preclude its effective use in many VR/AR display systems. FIGS. 2-14 illustrate techniques for effective compression of a lightfield and subsequent decompression of portions of the compressed lightfield needed to render a specified view of a scene represented by the lightfield for display at a head-mounted display (HMD) device or other display device. In at least one embodiment, the images of a two-dimensional array of images representing a lightfield are organized into a binary tree structure. The image at each non-leaf node of the binary tree structure may serve as reference image for reconstructing one or more tiles of the image at one or more nodes descendent from the non-leaf node and which may be considered to be primarily redundant in view of the image content contained in the reference image, or otherwise exhibit low disparity from the reference image, thereby allowing the pixel data representing the one or more tiles to be discarded or otherwise eliminated from a resulting compressed version of the lightfield. This hierarchical redundant image tile replacement approach results in a compressed lightfield represented by a reduced amount of data, thereby making storage, transmission, and processing of the compressed lightfield more practicable than its uncompressed form. For example, the reduced storage, transmission, and processing requirements may enable such a lightfield to be utilized by a compute-enabled smart phone, tablet computer, or other mobile consumer device for rendering imagery for a VR or AR application provided by the mobile consumer device.

As described herein, in some embodiments a disparity derivative vector (DDV) is calculated for some or all of the tiles of a reference image (that is, the image located at a non-leaf node of the binary tree structure). The DDV for an image tile at position $(s_i, t_i)$ in the st plane describes how to reconstruct a tile at the same position $(s_i, t_i)$ for every other image in the uv plane that refers to the reference image (that is, is an image at a descendant node of the reference node). The DDV for an image tile, in one embodiment, is represented by one or more of a set of disparity derivatives: ds/du, dt/du, ds/dv, and dt/dv, with each disparity derivative describing how the reference image is shifted under a window representing a tile at position $(s_i, t_i)$ that is to be reconstructed for a descendent node, and in which each disparity derivative is a function of the positional relationship between the reference image and the candidate image being considered for elimination, as described in greater detail herein.

Figure 2:
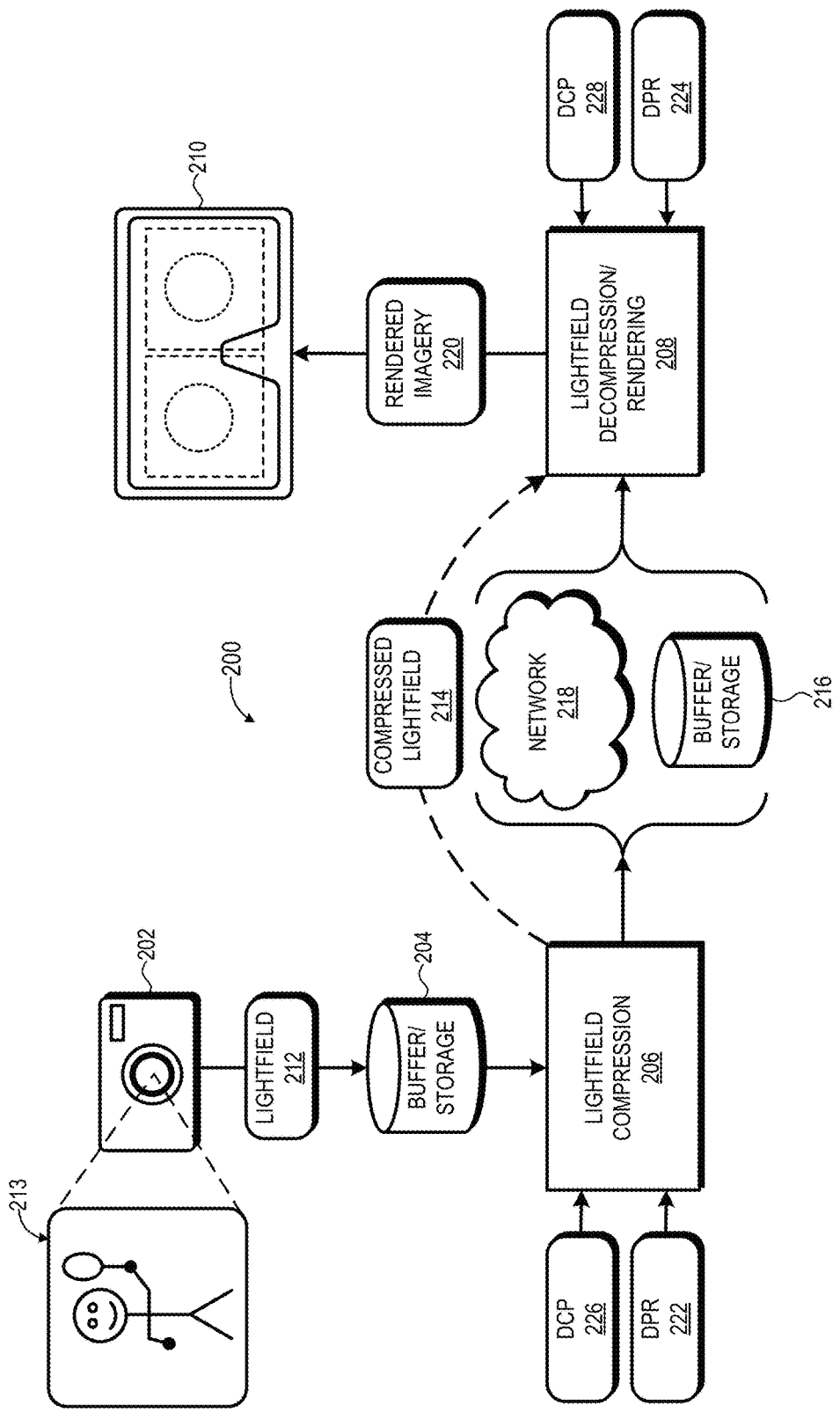
FIG. 2 is a block diagram of a lightfield-enabled display system in accordance with some embodiments.
Figure 3:
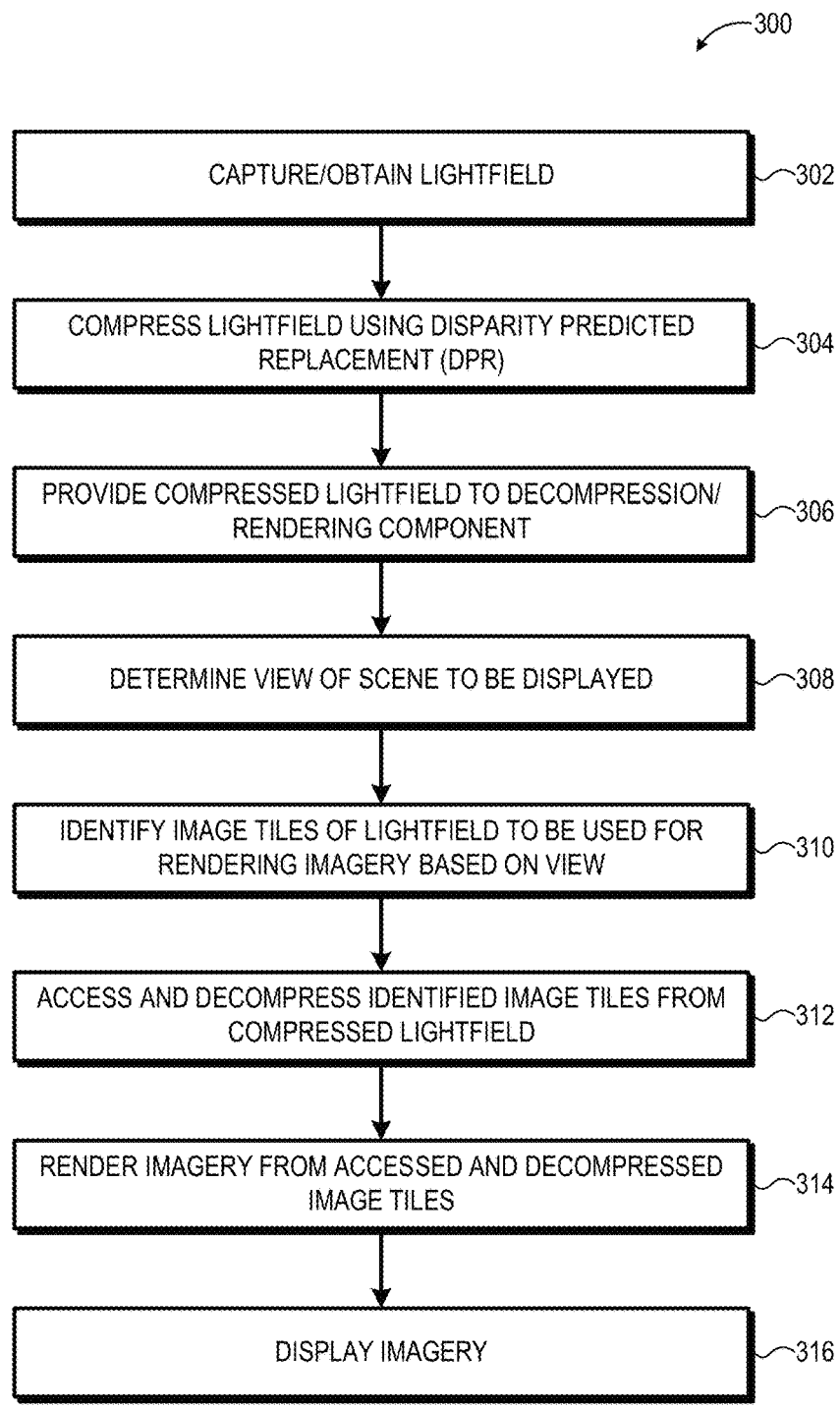
FIG. 3 is a flow diagram illustrating a method for processing a lightfield using disparity predicted replacement (DPR) compression and decompression processes in accordance with some embodiments.

FIG. 2 illustrates an example display system 200 utilizing disparity predicted replacement (DPR)-based lightfield compression and decompression and FIG. 3 illustrates a method 300 of an operation of the display system 200 in accordance with some embodiments. The display system 200 includes a lightfield generation device 202, a lightfield compression component 206, a lightfield decompression/rendering component 208, and a display device 210.

The method 300 of FIG. 3 initiates at block 302 with the lightfield generation device 202 generating or obtaining a lightfield 212 representing a scene 213. To illustrate, the lightfield generation device 202 can comprise, for example, a lightfield camera configured to capture the lightfield 212, such as via a multiple camera rig configured to capture multiple images of the scene 213 from different perspectives on a uv plane, with the resulting multiple images arranged in an 2D image array format, such as that illustrated by 2D image array 102 of FIG. 1. Alternatively, the lightfield generation device 202 may comprise a graphics rendering device configured to generate the lightfield 212 of a VR or AR implementation of the scene 213 by rendering the images of the image array of the lightfield 212 using any of a variety of well-known lightfield rendering techniques. Whether generated through image capture or graphics rendering, the lightfield 212 is buffered or otherwise stored in the storage device 204 (for example, random access memory, a disc drive, etc.) for further processing. At block 304, the lightfield compression component 206 operates to compress the lightfield 212 to generate a compressed lightfield 214 represented by less data than the lightfield 212, and thus better suited for efficient storage, transmission and processing.

As such, at block 306 the compressed lightfield 214 is provided to the lightfield decompression/rendering component 208 for further processing, whereby the compressed lightfield 214 is provided by storing the compressed lightfield 214 in a storage device 216 accessible by both components 206, 208, by transmitting a representation of the compressed lightfield 214 from the lightfield compression component 206 to the lightfield decompression/rendering component 208 via one or more networks 218 or other data communication interconnects (e.g., data transmission cables), or the combination thereof. To illustrate, the components 206, 208 may be implemented as components of a larger device, and the storage device 216 may comprise system memory or a hard disc of the larger device. As another example, the components 206, 208 may be remote to each other, and the compressed lightfield 214 is provided from the component 206 to the component 208 via a server located on the network 218.

At block 308, the lightfield decompression/rendering component 208 operates to identify a view of the scene 213 to be displayed at the display device 210, and from this identified view identifies, at block 310, which tiles of which images of the compressed lightfield 214 are to be used to render imagery representative of the view (that is, which image tiles are "visible" in the identified view). At block 312, the lightfield decompression/rendering component 208 then accesses the identified image tiles from the compressed lightfield 214 and decompresses them to generate decompressed image tiles. From the decompressed image tiles, at block 314 the lightfield decompression/rendering component 208 renders one or more display images (rendered imagery 220), which are then provided to the display device 210 for display at block 316.

To illustrate, in some embodiments the display device 210 comprises a head mounted display (HMD) device, and the view of the scene 213 to be rendered is based on the current pose of the HMD device relative to the coordinate frame of reference of the scene 213. With this pose identified, the lightfield decompression/rendering component 208 identifies the tiles of the compressed lightfield 214 that represent imagery visible from the given pose, decompresses the identified tiles, renders a left-eye image and a right-eye image from the decompressed tiles, and provides the left-eye image and right-eye image to the HMD device for concurrent display so as to provide a user of the HMD a 3D view of the scene 213.

In some implementations, the lightfield decompression/rendering component 208 is implemented on a mobile device or other device with relatively limited processing, storage, or transmission resources. Accordingly, to facilitate efficient processing of the compressed lightfield 214 for use in generating the rendered imagery 220, the lightfield compression component 206 utilizes one or more lightfield compression techniques at block 304 to reduce the amount of data required to represent the compressed lightfield 214 as provided to the lightfield decompression/rendering component 208.

In many instances, there may be only minor differences, or disparities, between some or all of the images of the lightfield 212. To illustrate, if the lightfield 212 represents a scene that is far away or represents a scene that is planar, has diffuse material, and is of medium distance away, then the differences, or disparities, between each image in the 2D array of images is likely relatively negligible, thereby rendering at least portions of some or many of the images redundant. In at least one embodiment, the compression processes employed at the block 304 by the lightfield compression component 206 includes a compression technique 222, referred to herein as "disparity predicted replacement" or "DPR", that takes advantage of the redundancies between images tiles by preventing inclusion in the compressed lightfield 214 those redundant image tiles of images that have a low predicted disparity, or difference, with one or more other tiles in the same (s,t) tile position of other nearby images. More particularly, when there is a prediction of a low incidence of disparity between a tile at position ($s_i$, $t_i$) of one image and a corresponding tile at the same position ($s_i$, $t_i$) of a nearby image in the uv plane, in accordance with the DPR compression technique 222 the pixel data of the corresponding tile is eliminated entirely from the compressed lightfield 214.

As noted above, some or all of the redundant tiles eliminated from the compressed lightfield 214 may be required by the lightfield decompression/rendering component 208 to render the imagery 220 for display at the display device 210. Accordingly, in some embodiments, the lightfield decompression/rendering component 208 utilizes, at the block 312, a complementary DPR decompression technique 224 in which an image tile at tile position ($s_i$, $t_i$) and which was eliminated from the compressed lightfield 214 is reconstructed from a reference image by shifting the reference image relative to a reconstruction window representing the tile position ($s_i$, $t_i$) in accordance with one or more disparity derivatives associated with that tile position of the reference image, and then reconstructing the eliminated image tile from the pixels present in the reconstruction window after the reference image is shifted accordingly. The DPR compression technique 222 and DPR decompression technique 224 are described in greater detail below with reference to FIGS. 3-15.

The lightfield compression component 206 may utilize one or more other compression techniques in addition to the DPR compression technique 222, and the lightfield decompression/rendering component 208 may utilize one or more complementary decompression techniques in addition to the DPR compression technique 222. As an example, the lightfield compression component 206 can employ a disparity compensated prediction (DCP) compression process 226 and the lightfield decompression/rendering component 208 can employ a corresponding DCP decompression process 228. Generally, such schemes identify a subset of the images of the lightfield as reference images, and then perform motion searches of the other images relative to the reference images to encode the non-reference images as sets of motion residuals, and the encoded images may then be subsequently decoded using the motion residuals and reference images in a manner similar to the conventional motion-compensation-based coding and decoding of a video stream well known in the art. An example implementation of a DCP-based lightfield encoding and decoding is found in U.S. Pat. No. 6,693,964. Alternatively, any of a variety of non-DCP-based encoding schemes for lightfields as known the in art may be used instead of, or in addition to, a DCP-based encoding scheme. Examples of such encoding schemes include, but are not limited to, JPEG-based encoding, PNG-based encoding, ASTC-based encoding, DXT-based encoding, and the like. Thus, unless otherwise noted, reference herein to a DCP-based encoding scheme may equally apply to non-DCP-based encoding schemes.

Figure 4:
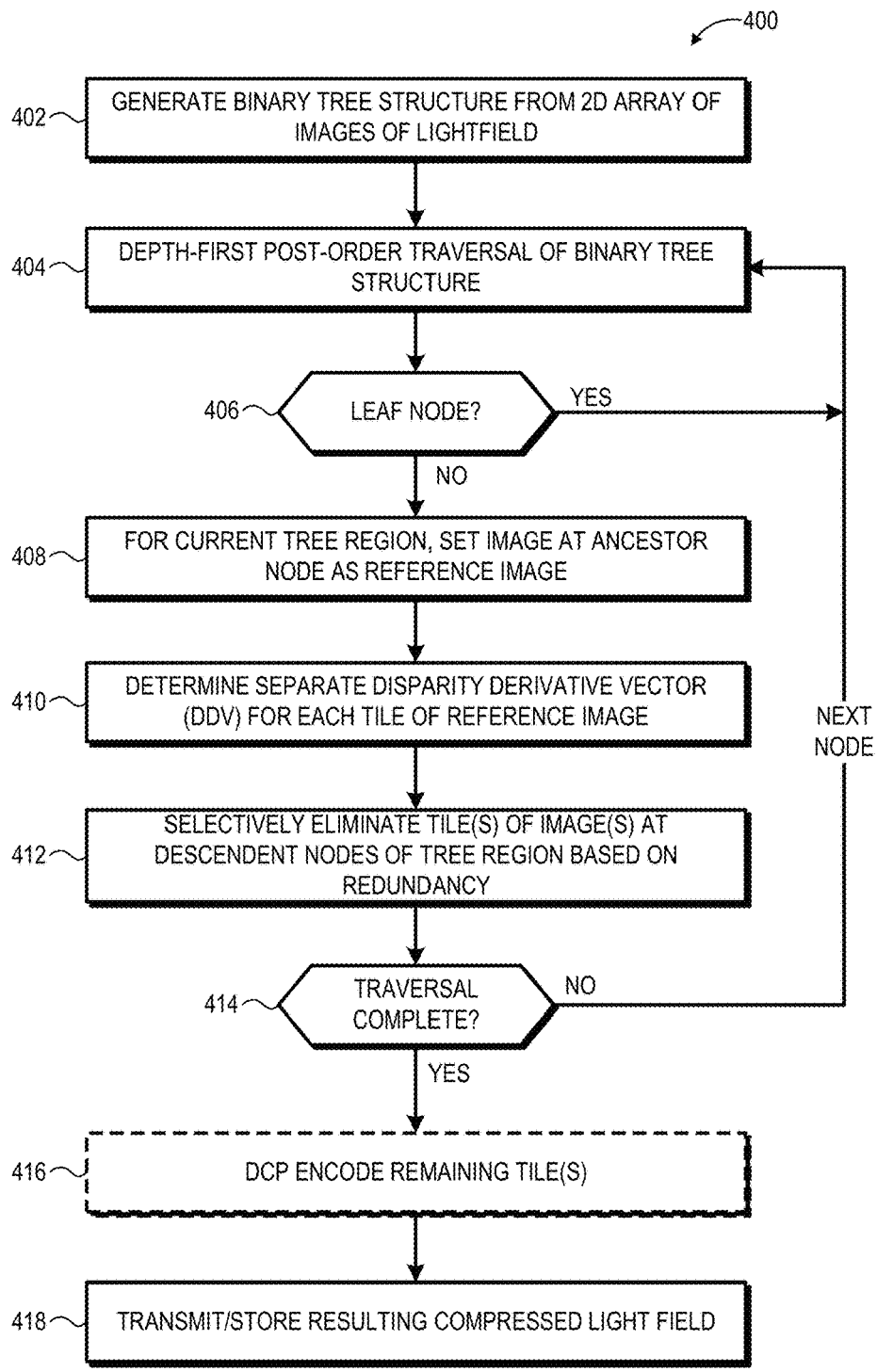
FIG. 4 is a flow diagram illustrating a method for compressing a lightfield using a DPR compression process in accordance with some embodiments.

FIGS. 4-10 illustrate example techniques and systems for compression of a lightfield using disparity predicted replacement, and the subsequent storage or transmission thereof, as represented by blocks 302, 304, 306 of method 300 of FIG. 3. Turning to FIG. 4, an example method 400 representing a general overview of an example of the lightfield compression process utilizing the DCP compression technique 222 is illustrated in accordance with some embodiments. The method 400 commences following capture or generation of the lightfield 212, where at block 402 the lightfield compression component 206 generates a binary tree structure from the 2D array of images representing the lightfield 212 along the uv plane, with each node of the resulting binary tree structure comprising a corresponding image of the 2D array.

Figure 5:
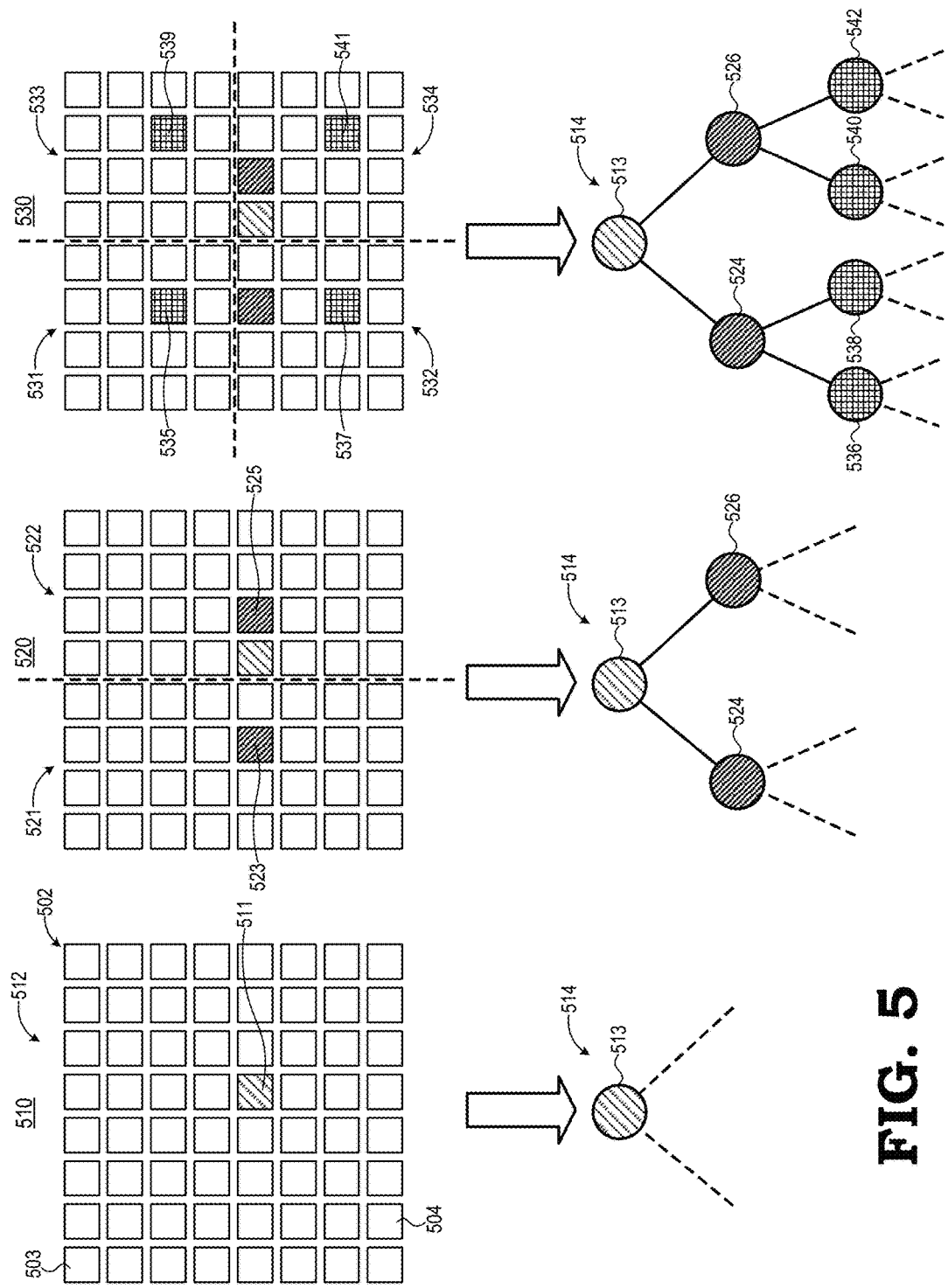
FIG. 5 is a diagram illustrating an example implementation of a process to organize a binary tree from images of a lightfield in accordance with at least some embodiments.

Turning briefly to FIG. 5, this figure illustrates an example of the first three stages of this binary tree conversion process using an example lightfield 512 composed of an 8×8 2D array 502 of images (e.g., images 503, 504). As shown by the first stage 510, an image 511 at the center of the 2D array 502 is selected as the root ancestor node 513 of a corresponding binary tree structure 514. At the second stage 520, the 2D array 502 is divided into two substantially equal regions 521, 522, and an image 523 at a center of the region 521 is selected as the ancestor node 524 for all images in region 521 in the binary tree structure 514, whereas an image 525 at a center of the region 522 is selected as the ancestor node for all images in region 522 in the binary tree structure 514. This bifurcation process is again repeated at the third stage 530, whereupon the region 521 is bifurcated into regions 531, 532, and the region 522 is bifurcated into regions 533, 534. An image 535 at the center of region 531 is selected as the ancestor node 536 for all images in region 531, an image 537 is selected as the ancestor node 538 for all images in region 532, an image 539 is selected as the ancestor node 540 for all images in region 533, and an image 541 is selected as the ancestor node 542 for all images in region 534. The bifurcation process illustrated by stages 510, 520, 530 repeats until the resulting regions of the 2D array 502 are single images, which then would form the leaf nodes of the binary tree structure 514.

With a binary tree structure 514 so constructed, each non-leaf node of the binary tree structure 514 is referred to herein as a "reference node", and each image at a reference node may serve as a "reference image" for replacing tiles of one or more images at descendant nodes of the reference node using the DPR compression process described herein. To illustrate, the image 511 at node 513 may serve as a reference image for all of the images of the lightfield 502 as node 513 is the root ancestor node 513 of the binary tree structure 514. The image 523 at node 524 may serve as a reference image for the images of regions 531 and 532 (including images 535 and 537), as the images of these regions are represented by nodes that are descendants of the node 524. Likewise, the image 525 at node 526 may serve as a reference image for the images of regions 533 and 534 (including images 539 and 541), as the images of these regions are represented by nodes that are descendants of the node 526.

Returning to FIG. 4, with the binary tree structure generated, at block 404, the lightfield compression component 206 performs a depth-first post-order traversal of the tree structure to select a node of the binary tree structure that has not yet been visited by a previous iteration of block 404. At block 406, the lightfield compression component 206 determines whether the selected node is a leaf node. If so, the method 400 returns to block 404 for the next iteration of the depth-first traversal. Otherwise, with a non-leaf node selected, at block 408 the image at the selected node is set as the reference image for all of the images at descendant nodes of the selected non-leaf node, with all such nodes descendant from the reference node referred to herein as the "tree region" of the reference node.

As explained above, the images of the 2D array of the lightfield 212 are composed of a corresponding 2D array of image tiles positioned in the st plane. Each image tile of a reference image may be used, in effect, as the basis for subsequently reconstructing a tile at the same tile array position in one or more descendant images in the binary tree structure. As described in greater detail below, this tile reconstruction, in at least one embodiment, relies on a shifting of a portion of the reference image that includes the reference image tile and up to three adjacent reference image tiles relative to one or more of the u, v, s, or t dimensions under a "window" representing the image tile to be reconstructed. The direction and degree of shifting to be applied to the appropriate reference tiles of the reference image are represented by a disparity derivative vector (DDV) that represents the disparity derivatives ds/du, dt/du, ds/dv, and dt/dv (some or all of which may be zero or a non-zero number of pixels or other spatial unit). Accordingly, at block 410 the lightfield compression component 206 determines a separate DDV for each image tile of the current reference image for inclusion in the compressed lightfield 214 for use in a subsequent decompression process, as described below.

Figure 6:
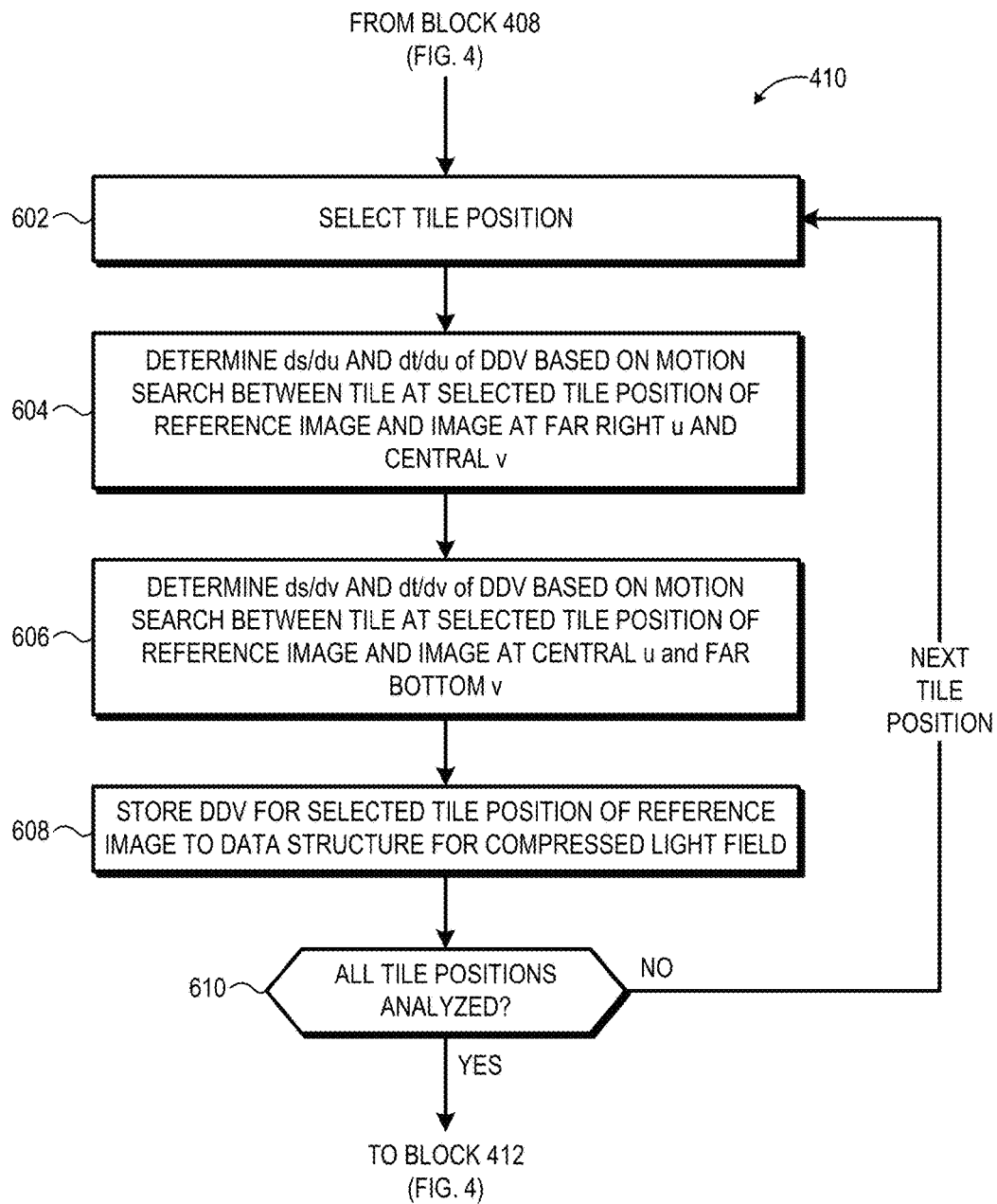
FIG. 6 is a flow diagram illustrating a method for calculating a disparity derivative vector (DDV) for an image tile of an image of a lightfield in accordance with some embodiments.

Turning briefly to FIG. 6, this figure illustrates an example implementation of the DDV determination process of block 410 of method 400 in accordance with some embodiments. As noted, a reference image is composed of a 2D array of image tiles, with each image tile located at a corresponding tile position within the tile array. Accordingly, at an iteration of block 602, the lightfield compression component 206 selects a tile position ($s_i$, $t_i$) and accesses the image tile of the reference image at that tile position (this image tile referred to herein as the "reference tile").

At blocks 604 and 606, the lightfield compression component 206 determines the disparity derivatives ds/du and dt/dv for the tile position ($s_i$, $t_i$) of the reference image based on a determination of disparities (with respect to the s and u dimensions and the t and v dimensions) between the reference image tile and image tiles at the same tile position in other images in the same region. In one embodiment, the disparity derivatives ds/du and dt/dv are determined on the basis of two motion searches: one motion search between the reference image tile and the image tiles of the descendant node at the far right u dimension and central v dimension to determine ds/du and dt/du (block 604); and one motion search between the reference image tile and the image tiles of the descendant node at the far bottom v dimension and the central u dimension of the images within the tree region of the reference image to determine ds/dv and dt/dv (block 606). The motion vectors found to be the best fit for these motion searches then are used to define the disparity derivatives of the DDV. To illustrate, the motion search produces a delta s and a delta t pair. The position of the target image tile in the u,v plane relative to the position of the reference image tile provides a delta u and delta v pair. Because an image tile directly to the right (or left) is used, followed by an image directly above (or below), the lightfield compression component 206 is able to solve for ds/du=delta s/delta u and dt/du=delta t/delta u in the first step and ds/dv=delta s/delta v and dt/dv=delta t/delta v in the second step.

Figure 7:
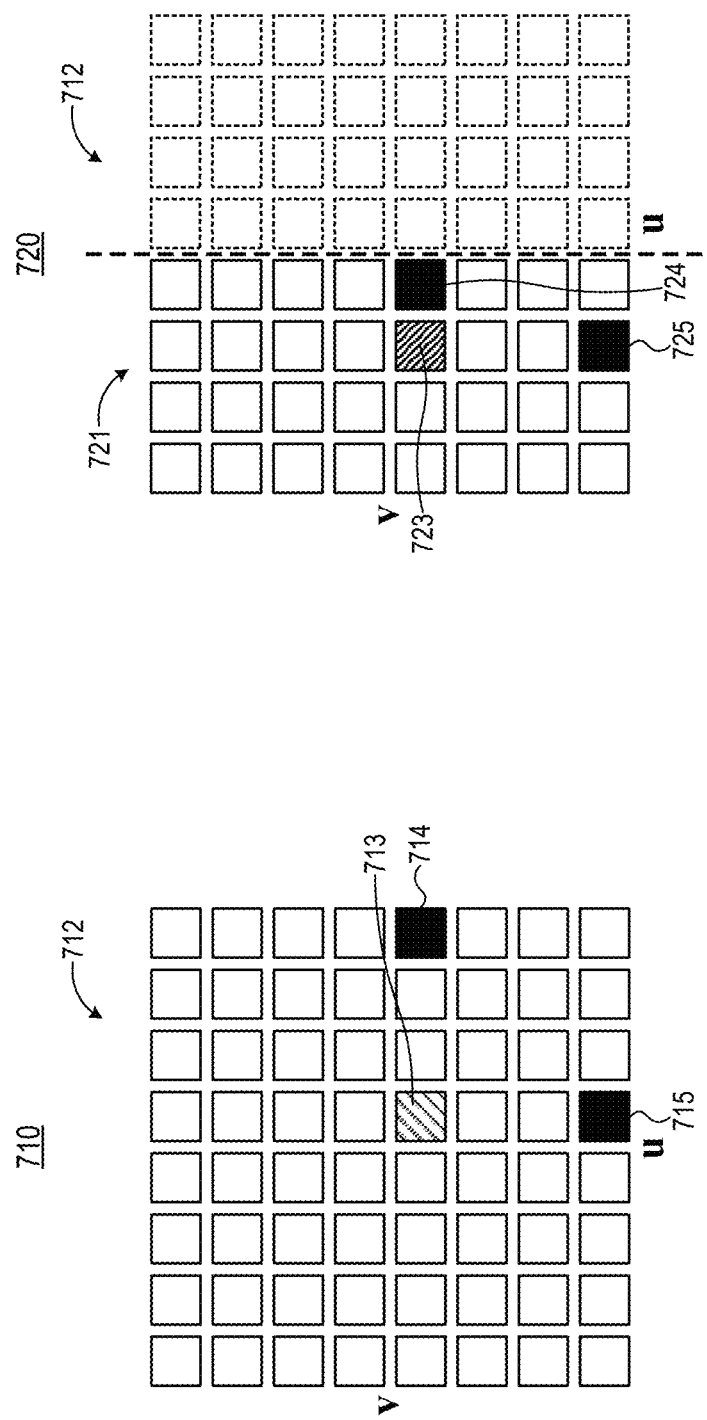
FIG. 7 is a diagram illustrating examples of selecting images for motion search analysis for the method of FIG. 6 in accordance with some embodiments.

To illustrate the motion search processes, turning briefly to FIG. 7, stage 710 illustrates an 8×8 lightfield 712 having an image 713 that serves as the root reference node for all images of the lightfield 712. Thus, to determine the ds/du and dt/du disparity derivatives for a reference image tile of the image 713, the lightfield compression component 206 may perform a motion search for the reference image tile relative to the descendant image 714 at the far right u and central v dimensions of the tree region defined by the node containing image 713 (which is the entire 2D array of images as this node is the root node), and the motion vectors that best fit the motion search results are used as the basis for the ds/du and dt/du disparity derivatives. Similarly, to determine the ds/dv and dt/dv disparity derivatives for a reference image tile of the image 713, the lightfield compression component 206 may perform a motion search for the reference image tile relative to the descendant image 715 at the far right u and central v dimensions of the tree region defined by the node containing image 713, and the motion vectors that best fit the motion search results are used as the basis for the ds/dv and dt/dv disparity derivatives.

As another example, stage 720 illustrates the lightfield 712 as having an image 723 that serves as the reference node for all images of the left-half tree region 721 of the lightfield 712. Thus, to determine the ds/du and dt/du disparity derivatives for a reference image tile of the image 723, the lightfield compression component 206 may perform a motion search for the reference image tile relative to the descendant image 724 at the far right u and central v dimensions of the tree region 721. Similarly, to determine the ds/dv and dt/dv disparity derivatives for a reference image tile of the image 723, the lightfield compression component 206 may perform a motion search for the reference image tile relative to the descendant image 725 at the far right u and central v dimensions of the tree region 721.

Returning to FIG. 6, at block 608 the determined disparity derivatives are stored as a representation of a corresponding DDV to the data structure representing the compressed lightfield 214 under generation. For example, each disparity derivative may be quantized as a sixteen bit value, and the resulting values then may be entropy encoded or otherwise compressed to further reduce storage/transmission requirements. At block 610, the lightfield compression component 206 determines whether a DDV has been determined for all reference tile positions of the reference image. If not, the method flow returns to block 602 whereupon the next reference tile position is selected in a next iteration of the processes of blocks 602, 604, 606, 608, and 610. After all reference tile positions have been analyzed for generation of a corresponding DDV, the method flow proceeds to block 412 of method 400.

Returning to FIG. 4, at block 412 the lightfield compression component 206 performs a selective tile elimination process that compares the reference image tile at a tile position ($s_i$, $t_i$) of the reference image set at block 408 with the corresponding tile at the same tile position of an image at a descendant node of the reference image, and if there is sufficient redundancy (or low predicted disparity) between the reference image tile and descendant image tile, the descendant image tile may be excluded from inclusion in the data structure representing the compressed lightfield 214 (that is, eliminated from the compressed lightfield 214). This comparison and selective tile elimination process is repeated for each descendant tile in the tree region defined by the reference image selected at block 408 of the current iteration.

Figure 8:
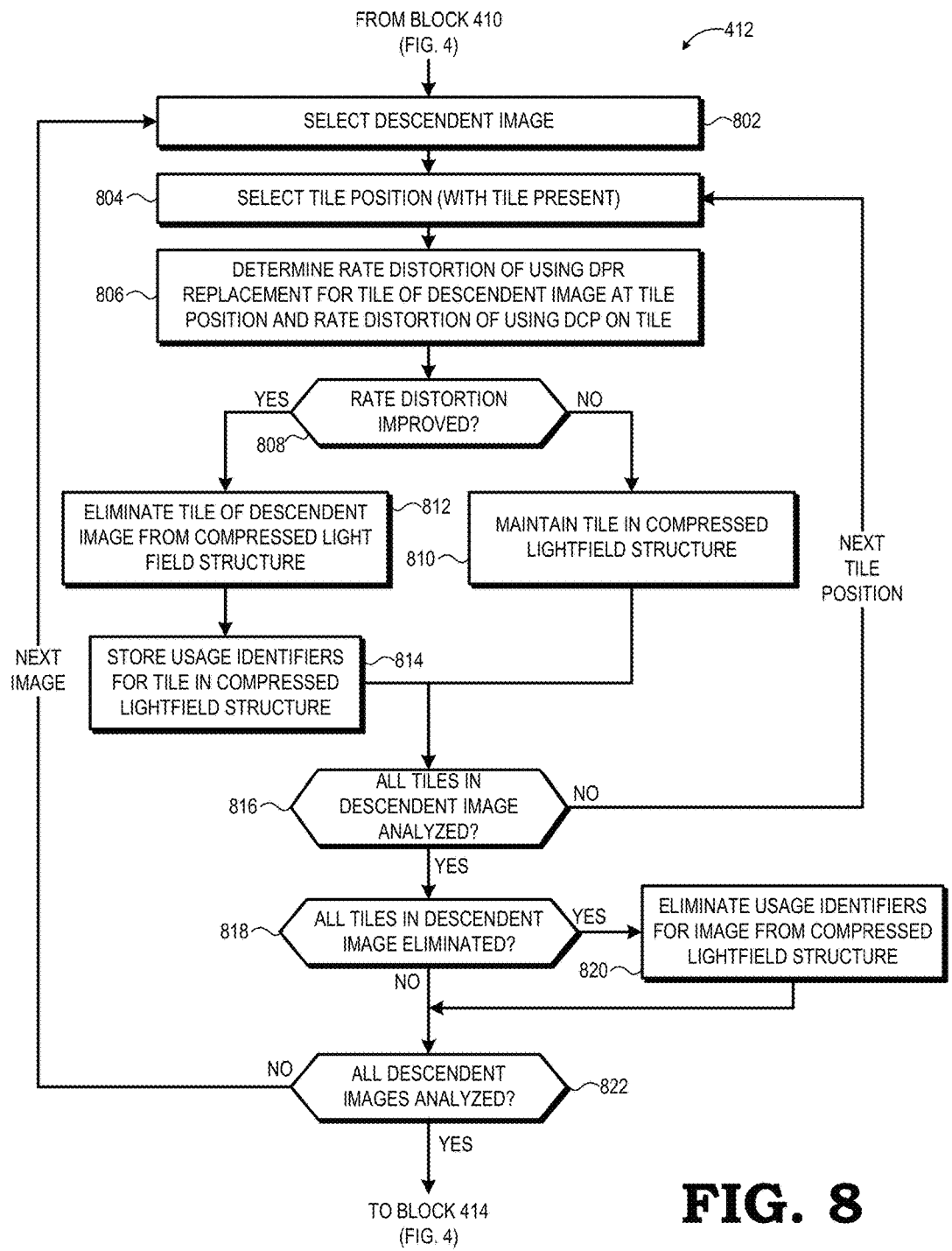
FIG. 8 is a flow diagram illustrating a method for selectively eliminating tiles of images of a tree region of a lightfield during compression in accordance with some embodiments.

Turning to FIG. 8, this figure illustrates an example method for implementing the selective tile elimination process of block 412 of method 400 in accordance with some embodiments. With a reference image selected at block 408 and the DDVs of each image tile of the reference image determined at block 410 of the current iteration, an iteration of the tile elimination process of block 412 initiates at block 802 with selection of a descendant image of the reference image for the current iteration. In some embodiments, the lightfield compression component 206 selects each descendant child in a post-order depth-first traversal of the nodes of the tree region defined by the reference image.

At block 804, the lightfield compression component 206 selects a tile position of the descendant image for further analysis. As described herein, in some embodiments other forms of compression may be employed in addition to the DPR compression process, and in such instances some or all of the image tiles of the descendant image may have already been encoded in some form. In such instances, if a selected tile position of the descendant image contains an encoded image tile, this encoded image tile may be decoded for DPR compression evaluation, and if the DPR compression of the tile provides a better result, then the encoded image tile may be replaced with the DPR-encoded version.

As explained above, an image tile may of a descendant node be effectively redundant in view of a corresponding reference image tile in the same tile position at the ancestor node, and thus the image tile of the descendant node may be eliminated from inclusion in the compressed lightfield 214 in the event that there is sufficient redundancy between the image tile of the descendant node and a shifted (or in some instances unshifted) version of the reference image tile. In one embodiment, at block 806 the lightfield compression component 206 evaluates the extent of such redundancies by determining the rate distortion introduced by replacement of a candidate image tile (that is, the tile at the same tile position in the descendant image) by the corresponding reference tile, determining the rate distortion that would be introduced by encoding the image tile by some other means (e.g., DCP encoding), and then comparing results at decision block 808. If using the DPR approach does not improve the rate distortion equation, then at block 810 the image tile of the descendant image is added to, or otherwise maintained in, the data structure representing the compressed lightfield 214. In particular, when evaluating whether a tile in a non-leaf node can be replaced as redundant, the lightfield compression component 206 evaluates the rate distortion of all descendant tiles for which the tile could be used as a DPR reference tile. As such, the lightfield compression component 206 loops through all such descendant tiles, and if the rate distortion does not compare favorably for any one of the descendant tiles, then the candidate tile is maintained rather than replaced. Because of the post-order traversal of the tree at block 404 of method 400, any descendant tile that was previously determined to not be used as a candidate as a DPR reference need not be checked again in this process.

Returning to decision block 808, if the rate distortion equation is improved by replacing the image tile with the reference tile (that is, the reference tile has sufficient redundancy with the image tile of the descendant image), then at block 812 the lightfield compression component 206 eliminates the image tile of the descendant image from the data structure representing the compressed lightfield 214, which operates effectively as replacing the image tile of the descendant image with a shifted version of the reference tile that may be reconstructed during the decompression process, as described below. Further, at block 814, the lightfield compression component 206 may store one or more usage identifiers to the data structure representing the compressed lightfield 214 so as to facilitate identification of how the replaced image tile may be used in the DPR decompression process. For example, in one embodiment, the usage identifiers for a replaced image tile include one bit or flag to indicate that the image data for a replaced image tile will not be used during any reconstruction process, and thus all of the image data of the replaced image tile may be eliminated entirely, and one bit or flat to indicate that image data of the replaced tile may be necessary to facilitate reconstruction of the image tile of a descendant node. This latter bit or flag is used to identify the neighboring "ancestor tiles" as described below Whether the image tile of the selected descendant image has been eliminated from or maintained in the compressed lightfield 214, at block 816 the lightfield compression component 206 determines whether all of the image tiles in the selected descendant image have been analyzed for replacement via an iteration of blocks 804-814. If not, then the method flow returns to block 804, whereupon a next tile position of the selected descendant image is selected for elimination analysis. Otherwise, if all tile positions have been considered, at block 818 the lightfield compression component 206 determines whether all of the image tiles in the selected descendant image have been eliminated from the compressed lightfield 214. If so, then at block 820 all remaining traces of the descendant image may be eliminated from the compressed lightfield 214, such as by removing the usage identifiers for each replaced image tile added at block 814, and thus having the effect as though the entirely-replaced descendant image tile never existed in the compressed lightfield 214. At block 822, the lightfield compression component 206 determines whether all of the descendant images in the tree region defined by the currently selected reference image have been analyzed for selective elimination of image tiles contained therein. If not, then the method flow returns to block 802 for the selection of the next descendant image in the tree region for a next iteration of the process of block 412. Otherwise, the method flow proceeds to block 414 of method 400.

Figure 9:
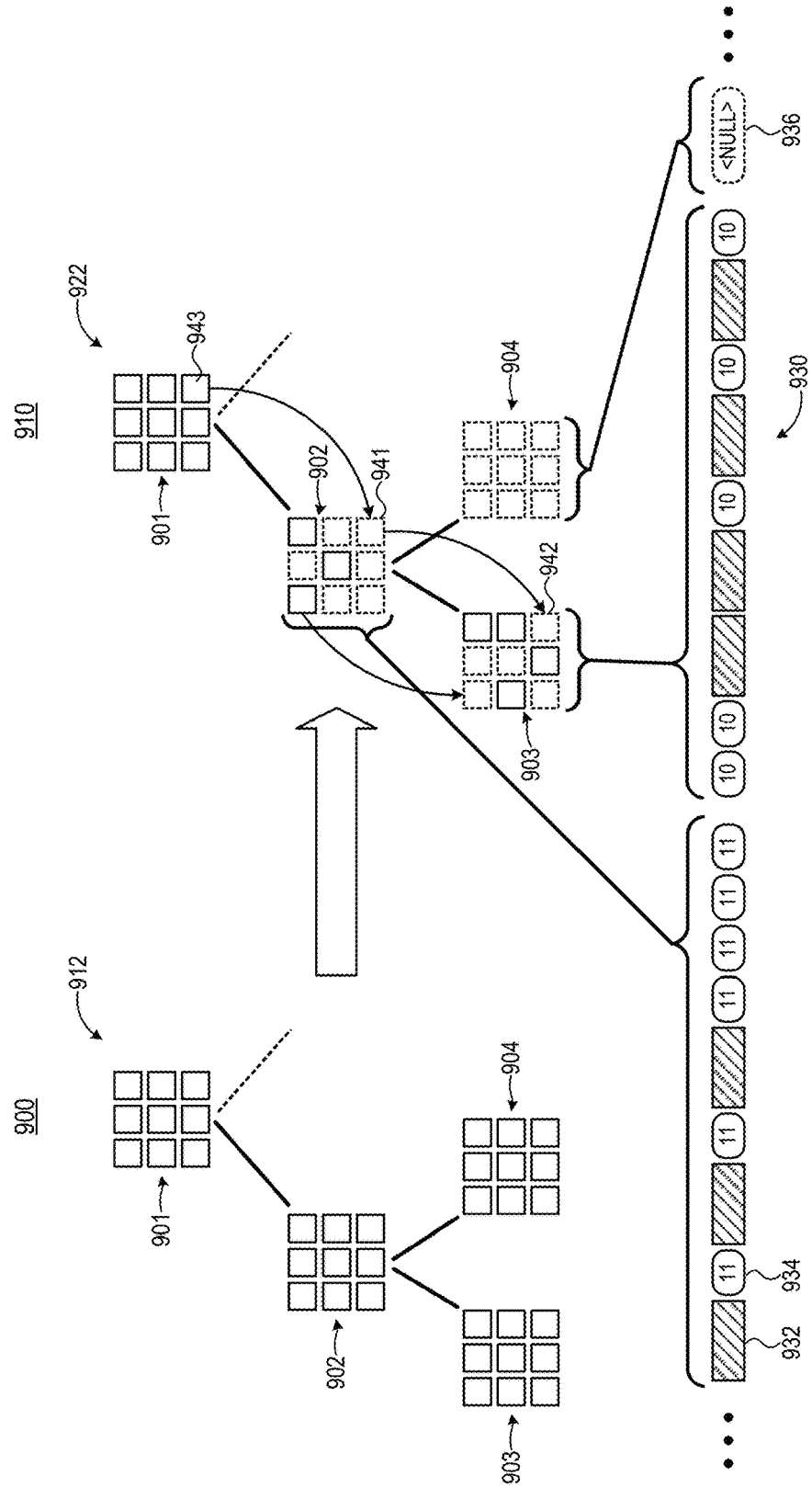
FIG. 9 is a diagram illustrating an example of the selective tile elimination method of FIG. 8 in accordance with some embodiments.

FIG. 9 illustrates an example application of the selective tile elimination process of block 412 in accordance with some embodiments. The depicted example is described in the context of a portion of a binary tree structure 912 representing an uncompressed lightfield 900 composed of images 901-904 at the illustrated nodes, whereby each image is composed of a 3×3 tile array. In this example, the application of the selective tile elimination process of block 412 to the binary tree structure 912 results in a modified binary tree structure 922 representing a compressed lightfield 910. As shown, the selective tile elimination process results in elimination of all but three image tiles in descendant image 902, five image tiles in descendant image 903, and complete elimination of the descendant image 904. FIG. 9 further illustrates an example data structure portion 930 representative of the images 902, 903, 904 in their compressed form in the compressed lightfield 910. As shown, the data fields containing image data for maintained image tiles are represented by hashed blocks (e.g., data field 932 for the image tile at position (0,0) of image 902) which may contain hundreds or thousands of bits, depending on the size of the image tiles. In contrast, the replaced image tiles are represented by corresponding two-bit fields (e.g., field 934 for the image tile at position (1,0) of image 902) that store the usage indicators for each eliminated/replaced image tile. Further, the replacement of all of the tiles of a descendant image results in removal of all data for the descendant image from the compressed lightfield 910, although a NULL identifier (e.g., NULL identifier 936 for eliminated image 904) may be utilized for data alignment purposes if appropriate.

Referring again back to FIG. 4, once all nodes of the binary tree structure have been visited, DDVs calculated for all reference tiles, and all descendent images analyzed for selective tile replacement, the DPR compression process may be considered complete. However, as noted above, in some embodiments additional compression techniques are applied in generating the compressed lightfield 214. To illustrate, after performing the DCP compression process, at block 416 a DCP compression process may be used to encode any remaining tiles into corresponding residuals so as to further compress the data in the compressed lightfield 214. Further, while the DPR compression process was described above in the example context of starting with an unencoded lightfield 212, in some embodiments a DCP compression process is performed first on the lightfield 212 to generate a DCP-encoded lightfield in which some of the images of the 2D array have been encoded as residuals in view of DCP reference images selected from the images of the 2D array. In such instances, those DCP-encoded tiles needed for DPR evaluation may be decoded for use in the DPR evaluation. If the DPR encoding of such an image tile provides a better result than the DCP encoding result, then the DCP-compressed version of that tile may be used in place of the DCP-encoded version of the tile. Further, this initial DCP encoding process may be performed, followed by the DPR compression process, and then followed by a second DCP encoding process to further encode any non-eliminated tiles in the DPR compression result. Following the DPR compression process and any follow-on encoding, at block 418 the resulting compressed lightfield 214 is transmitted to the lightfield decompression/rendering component 208, or locally or remotely stored for subsequent access by the lightfield decompression/rendering component 208.

Figure 10:
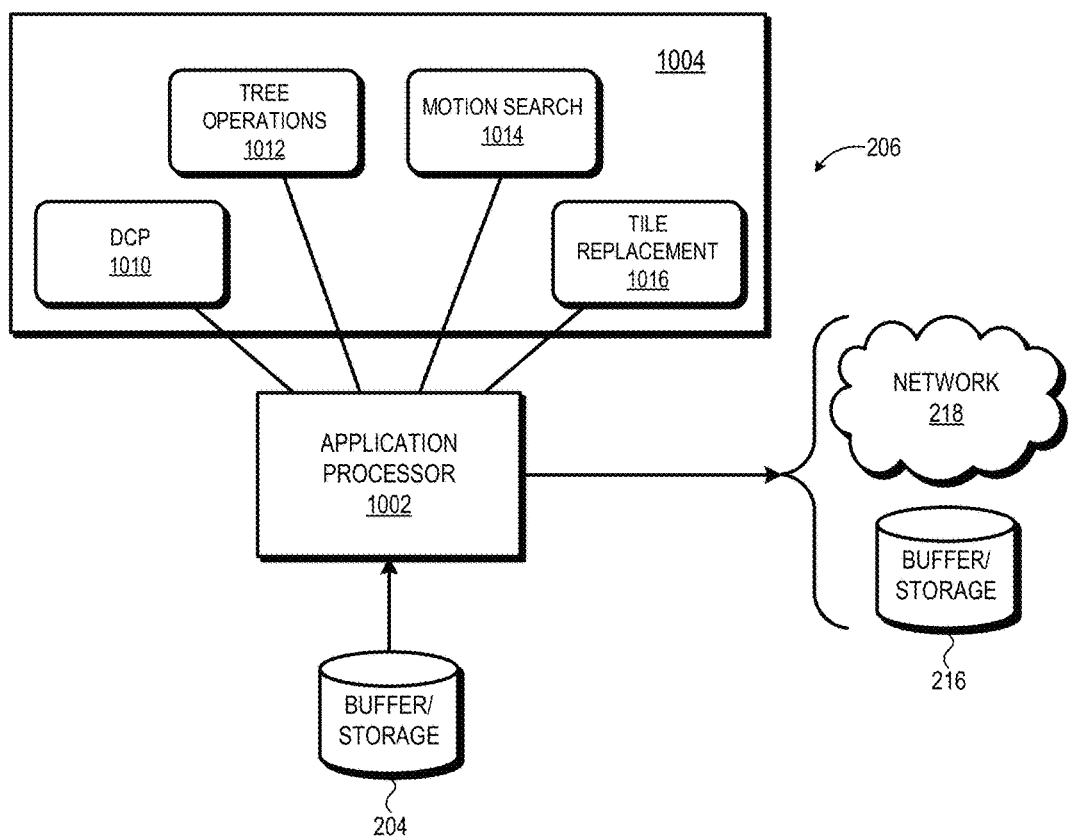
FIG. 10 is a diagram illustrating an example implementation of a lightfield compression device of the display system of FIG. 2 in accordance with some embodiments.

FIG. 10 illustrates an example hardware implementation of the lightfield compression component 206 in accordance with at least some embodiments. In the depicted example, the lightfield compression component 206 includes an application processor 1002 having an interface coupled to a non-transitory computer-readable storage medium 1004, an interface coupled to the storage device 204, and interfaces coupled to one or both of the network 218 and the storage device 216. The application processor 1002 may comprise one or more central processing units (CPUs), graphics processing units (GPUs), or combinations thereof. The computer-readable storage medium 1004 includes, for example, one or more random access memories (RAMs), one or more read only memories (ROMs), one or more hard disc drives, one or more optical disc drives, one or more Flash drives, and the like.

The computer-readable storage medium 1004 stores software in the form of executable instructions configured to manipulate the application processor 1002 to perform one or more of the processes described above with reference to FIGS. 2-9. To illustrate, this software may include, for example, a DCP module 1010 to perform DCP encoding processes as described herein, a tree operations module 1012 to perform the binary tree generation and traversal processes described herein, a motion search module 1014 to calculate the DDV for each reference tile on the basis of one or more motion search processes as described herein, and a tile replacement module 1016 to perform the selective tile elimination processes described herein.

Figure 11:
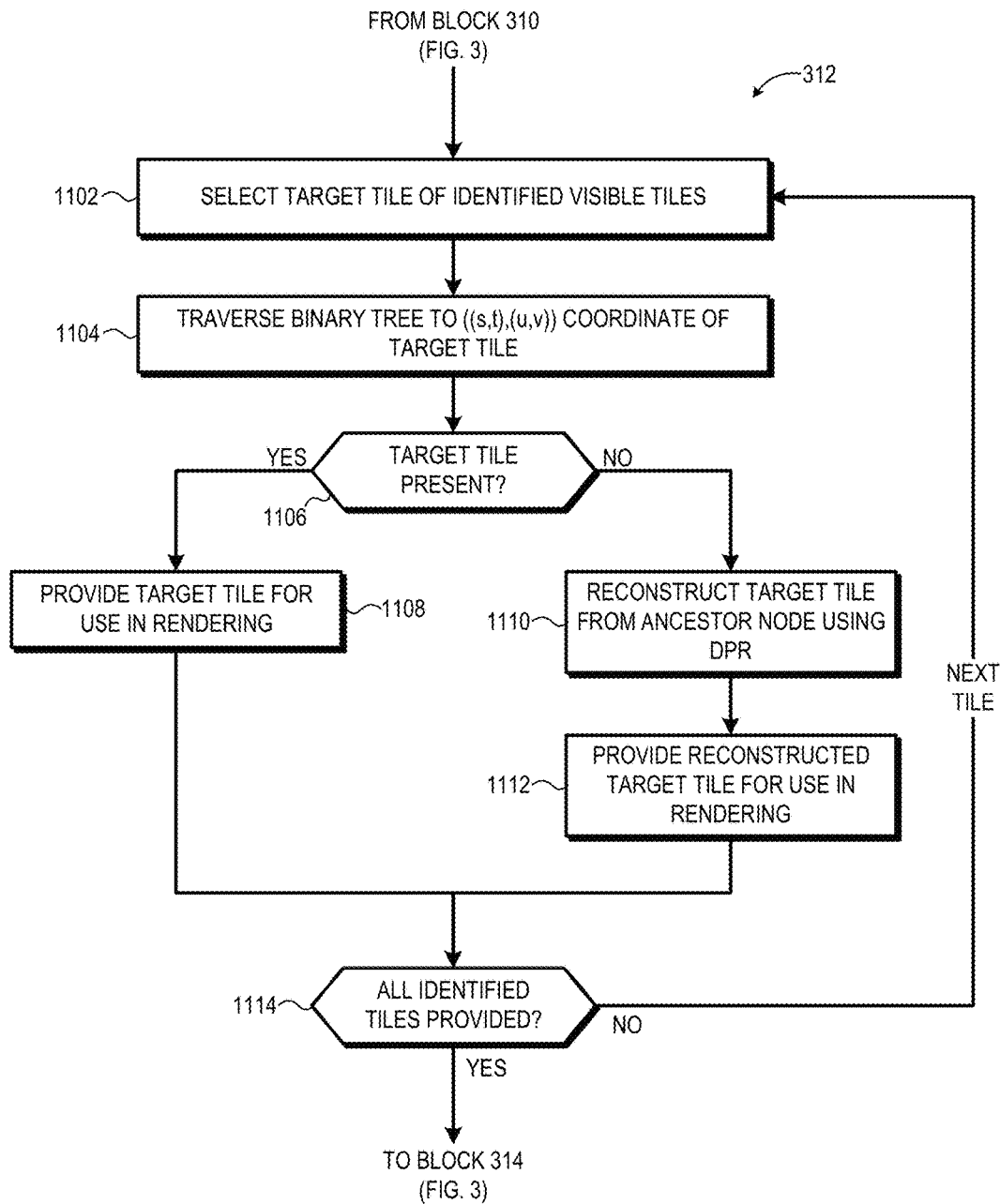
FIG. 11 is a flow diagram illustrating a method for decompressing a compressed lightfield using a DPR decompression process in accordance with some embodiment.

FIGS. 11-15 illustrate example techniques and systems for decompression of the compressed lightfield on the basis of disparity predicted replacement and rendering of display image therefrom, as represented by blocks 308, 310, 312, 314, 316 of method 300 of FIG. 3. Turning now to FIG. 11, an example implementation of the DPR-based decompression process of block 312 of method 300 is illustrated in accordance with at least one embodiment.

With the compressed lightfield 214 received at, or otherwise accessible by, the lightfield decompression/rendering component 208, the lightfield decompression/rendering component 208 may begin the process of rendering the imagery 220 (FIG. 2) for display at the display device 210. As described above, to identify the image content of a lightfield needed for rendering a particular view of the scene represented by the lightfield, the lightfield decompression/rendering component 208 first identifies the current view of a virtual camera into the coordinate space of the scene, and from this current view the lightfield decompression/rendering component 208 identifies which images of the lightfield, and which image tiles of those images, are visible from the current view. Any of a variety of well-known techniques for identifying image tiles of a two-plane lightfield representation that are visible from a current view may be employed in this determination.

With the visible image tiles so identified, at block 1102 the lightfield decompression/rendering component 208 selects one of the identified visible tiles as the "target tile" for the current iteration. At block 1104, the lightfield decompression/rendering component 208 traverses the binary tree structure representing the compressed lightfield 214 until it reaches the image containing the target tile, and then traverses the array of tiles of the image to the tile at the same tile position as the target tile (that is, the same (s,t)(u,v) coordinate). At block 1106, the lightfield decompression/rendering component 208 determines whether the target tile is present at the corresponding location in the binary tree structure of the compressed lightfield 214. That is, the lightfield decompression/rendering component 208 determines whether the target tile was eliminated in favor of a reference tile during the DPR compression process.

If the target tile is present in the binary tree structure, then at block 1108 the lightfield decompression/rendering component 208 accesses the image data of the target tile from the compressed lightfield 214 for use in rendering corresponding imagery. However, if the target tile has been eliminated from the compressed lightfield 214, then at block 1110 the lightfield decompression/rendering component 208 reconstructs the eliminated target tile from the corresponding reference tile of an ancestor node using the DPR process, as described in greater detail below with reference to FIG. 12. At block 1112, the reconstructed target tile is then used by the lightfield decompression/rendering component 208 in rendering the corresponding imagery. At block 1114 the lightfield decompression/rendering component 208 determines whether all identified visible tiles needed for rendering the imagery have been obtained, either by accessing the tile from the compressed lightfield 214 or reconstructing the tile using DPR. If not, then the method flow returns to block 1102 for the next visible tile to be obtained. If so, then the method flow proceeds to block 314 of method 300, which was described above.

Figure 12:
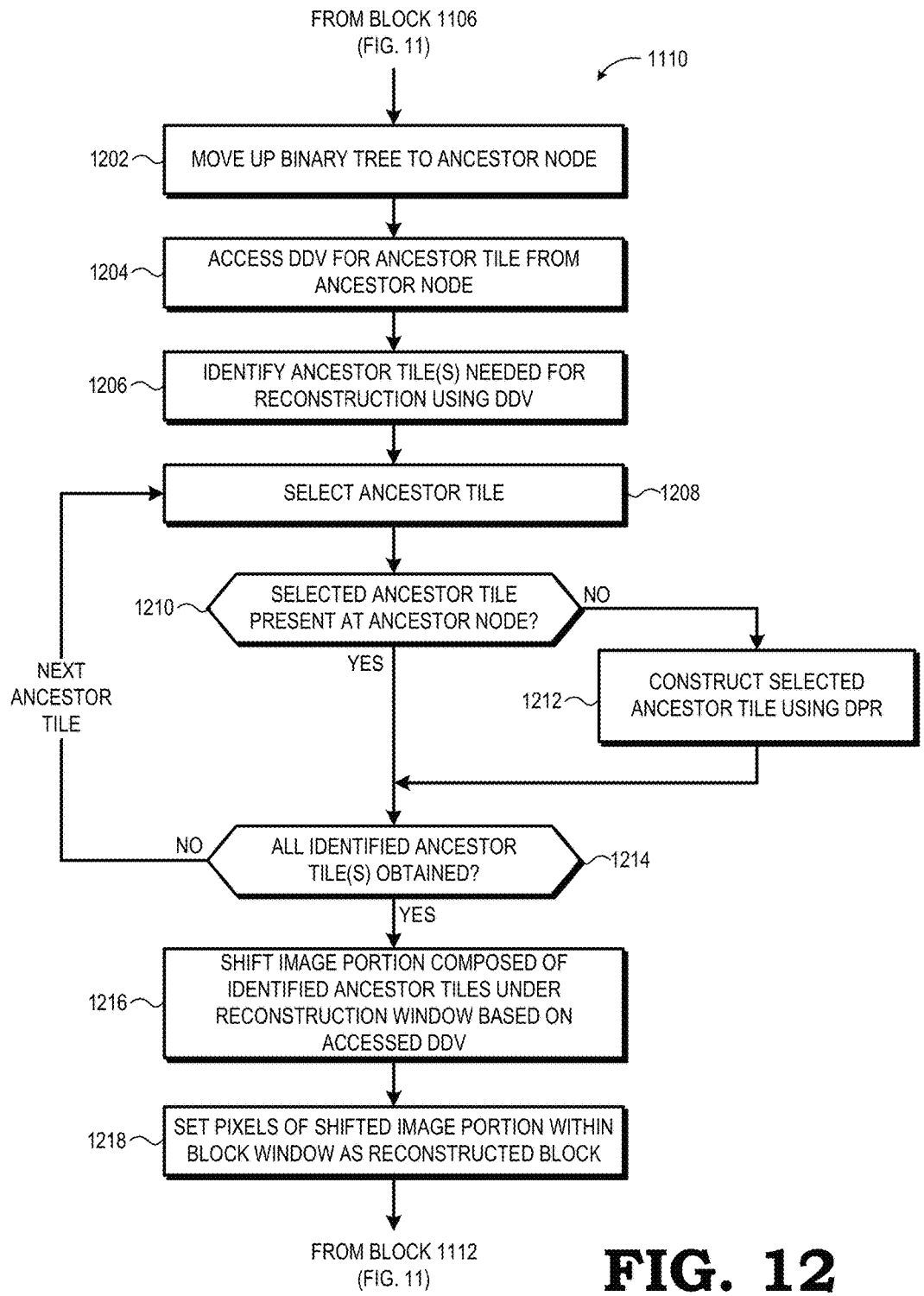
FIG. 12 is a flow diagram illustrating a method for reconstructing an image tile of an image of a lightfield using a DDV of the corresponding tile of an DPR reference image in accordance with some embodiments.

FIG. 12 illustrates an example implementation of the DPR-based tile reconstruction process in accordance with some embodiments. As noted above, a tile eliminated from the compressed lightfield 214 and which has been identified as "visible" for purposes of rendering imagery representative of a particular view of the scene 213 is reconstructed from reference images at one or more of the ancestor nodes of the node representing image containing the tile to be reconstructed. Accordingly, to initiate the reconstruction process, at block 1202 the lightfield decompression/rendering component 208 moves up the binary tree structure representing the compressed lightfield 214 to the immediate ancestor node of the node representing the image tile to be reconstructed. At block 1204, the lightfield decompression/rendering component 208 accesses from the ancestor node the DDV for the reference tile at the same tile position ($s_i$, $t_i$) as the tile to be reconstructed.

As explained above, the DDV for a reference tile at tile position ($s_i$, $t_i$) of a reference image describes how to reconstruct every other tile at the same tile position for every image that refers to the reference image. That is, the DDV for a reference tile specifies how the reference image containing that reference tile is to be shifted or otherwise manipulated relative to the u, v, s, and t dimensions relative to a reconstruction window representing the boundary of the tile to be reconstructed so as to identify the array of pixels of the reference image that are to constitute the reconstructed tile. As such, it may require up to three additional tiles of the reference image in addition to the reference tile to reconstruct the identified tile. Accordingly, at block 1206 the lightfield decompression/rendering component 208 uses the disparity derivatives represented by the DDV of the reference tile to determine which tiles of the reference image also will need to be accessed from the compressed lightfield 214 in order to reconstruct the target tile. To illustrate, if the DDV of the reference tile has a negative, non-zero ds/du derivative, then the tile of the reference image to the right of the reference tile will be used in reconstruction as a negative, non-zero ds/du derivative indicates that the reference image will be shifted to the left relative to the reconstruction window representing the boundary tile being reconstructed (note that this shift may be achieved by shifting the reference image or by shifting the reconstruction window). As another example, if the DDV of the reference tile has a positive, non-zero dt/dv, then the resulting shift of the reference image will be upwards relative to the window boundary, and thus the tile of the reference image immediately below the reference tile will need to be accessed for the reconstruction process. The reference tile and any other tiles of the reference image so needed for reconstruction purposes are referred to herein as the "ancestor tiles" of the tile being reconstructed.

With the set of one or more ancestor tiles so identified, at block 1208 the lightfield decompression/rendering component 208 selects an ancestor tile from the set. It should be appreciated that, as the DPR compression process is recursive and hierarchical, the selected ancestor tile of the reference image may itself have been eliminated from the compressed lightfield 214 as redundant in view of a reference tile at a higher ancestor node. Accordingly, at block 1210 the lightfield decompression/rendering component 208 determines whether the compressed lightfield 214 contains the selected ancestor tile (that is, the ancestor tile was not itself eliminated as part of the DPR compression process).

If the selected ancestor is not present in the compressed lightfield 214, then at block 1212 the lightfield decompression/rendering component 208 performs the tile reconstruction process described by FIG. 12 to reconstruct the selected ancestor tile. To this end, the lightfield decompression/rendering component 208 identifies the first ancestor tile that has not been replaced and which has a DDV, and then uses this identified reference tile and its DDV to directly reconstruct the target tile using the described tile reconstruction process. To illustrate, referring back to FIG. 9, the modified binary tree structure 922 representing the compressed lightfield 910 depicts tile 941 of reference image 902 as being in the same tile position as tile 942 of image 903. As also illustrated, tile 942 has been eliminated from the compressed lightfield 910, and thus if tile 942 is required for rendering of imagery, the lightfield decompression/rendering component 208 would attempt to reconstruct tile 942 using tile 941 as the reference tile. However, as also shown in FIG. 9, tile 941 has been eliminated from the compressed lightfield 910 as well, and thus since image 901 has a tile 943 in the same tile position and with a DDV, the lightfield decompression/rendering component 208 would reconstruct tile 942 using the image 901 as the reference image for reconstruction of tile 942 (including tile 943 as the reference tile for this reconstruction). This same reconstruction process may be repeated for all other ancestor tiles that have been eliminated from the compressed lightfield 910.

Referring again to FIG. 12, at block 1214 the lightfield decompression/rendering component 208 determines whether all ancestor tiles of the set identified at block 1206 have been selected and obtained either from the compressed lightfield 214 or reconstructed from the reference image. If not, the method flow returns to block 1208 for selection of the next ancestor tile to be accessed or reconstructed. Otherwise, if all ancestor tiles of the set have been accessed or reconstructed, the lightfield decompression/rendering component 208 is ready to begin reconstruction of the eliminated tile from the set of one or more ancestor tiles.

Figure 13:
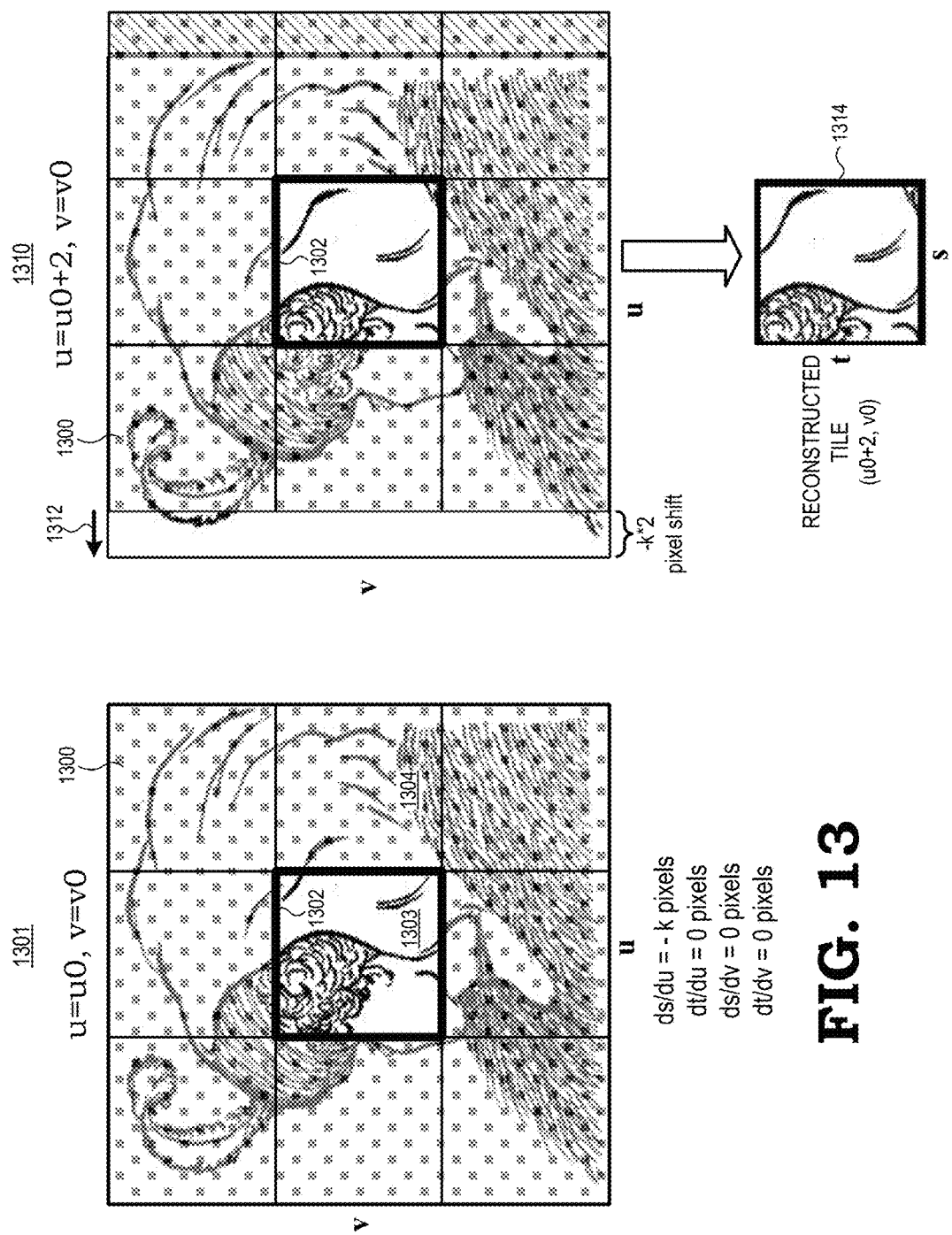
FIG. 13 is a diagram illustrating an example of the tile reconstruction method of FIG. 12 in accordance with some embodiments.
Figure 14:
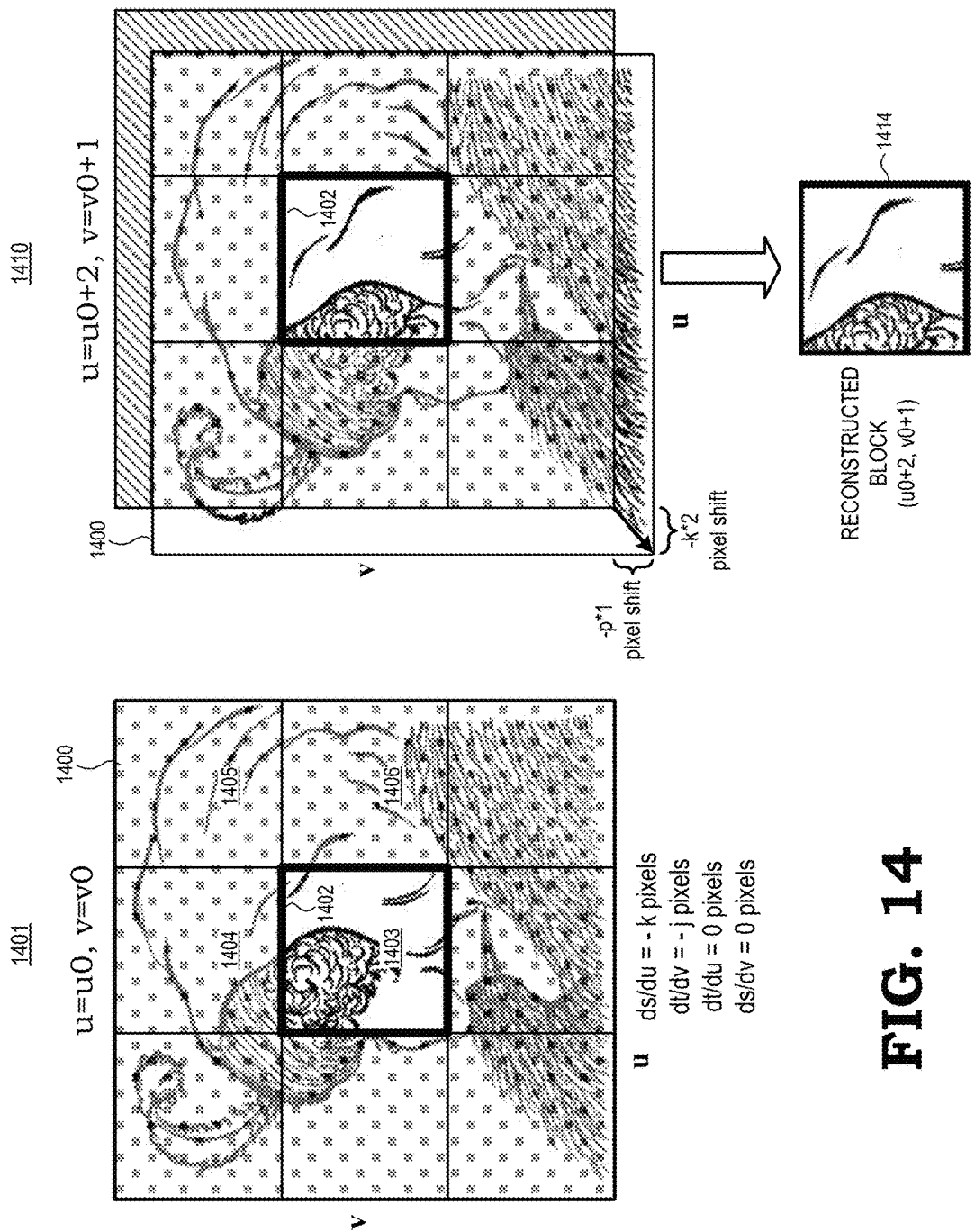
FIG. 14 is a diagram illustrating another example of the tile reconstruction method of FIG. 12 in accordance with some embodiments.

To reconstruct the eliminated tile, at block 1216 the lightfield decompression/rendering component 208 specifies a reconstruction window that represents the boundary of the tile being reconstructed, and then shifts or otherwise adjusts the reference image (or more specifically, the portion of the reference image represented by the set of ancestor tiles) relative to this reconstruction window based on the disparity derivatives of the DDV of the reference tile accessed at block 1204. With the pertinent portion of the reference image so shifted relative to the reconstruction window, at block 1218 the lightfield decompression/rendering component 208 sets those pixels of the shifted reference image/shifted reference image portion that fall within the boundary defined by the reconstruction window as the pixels of the reconstructed tile. FIGS. 13 and 14 illustrate two examples of this window shifting process.

For both examples, it is assumed that the descendent tile and the reference image are 3×3 array of tiles, and the tile being constructed is the center tile of the descendent tile. In the example of FIG. 13, a reference image 1300 is located at coordinates (u0, v0), while the descendant image having the tile under reconstruction is located at coordinates (u0+2, v0). Further, the DDV for the reference tile at the center tile position has a disparity derivative ds/du of −k pixels, while the other disparity derivatives (dt/du, ds/dv, dt/dv) are zero. Accordingly, as shown by initial stage 1301, a reconstruction window 1302 representing the boundary of the center tile position is located at its original position relative to the unshifted reference image 1300. Thus, the reconstruction window 1302 at this stage encompasses the corresponding reference tile 1303 of the reference image 1300.

As shown by shift stage 1310, the ds/du disparity derivative is −k pixels and the descendant image is two units away from the reference image 1300 in the u direction (that is, the positional relationship between the reference image 1300 and the descendant image is +2 in the u dimension of the 2D array), and thus the reference image 1300 is shifted by −2*k pixels in the u direction (that is, 2*k to the left relative to the orientation shown in FIG. 13) relative to the reconstruction window 1302, as represented by shift vector 1312. As a result, a 2*k wide portion of the left side of the reference tile 1303 is shifted out of the reconstruction window 1302, while a 2*k wide portion of the right side of the tile 1304 to the right of the reference tile 1303 is shifted into the reconstruction window 1302. The pixels of the shifted reference image 1300 present in the reconstruction window 1302 thus are set as a reconstructed tile 1314 for the center tile position of the descendant image.

In the example of FIG. 14, a reference image 1400 is located at coordinates (u0, v0), while the descendant image having the tile under reconstruction is located at coordinates (u0+2, v0+1). Further, the DDV for the reference tile at the center tile position has a disparity derivative ds/du of −k pixels, a disparity derivative of dt/dv of −j pixels, while the other disparity derivatives (dt/du, ds/dv) are zero. Accordingly, as shown by initial stage 1401, a reconstruction window 1402 representing the boundary of the center tile position is located at its original position relative to the unshifted reference image 1400. Thus, the reconstruction window 1402 at this stage encompasses the corresponding reference tile 1403 of the reference image 1400.

As shown by shift stage 1410, the ds/du disparity derivative is −k pixels and the descendant image is two units away from the reference image 1400 in the u direction, while the dt/dv derivative is −j pixels and the descendent image is one unit away from the reference image in the v direction. Accordingly, the reference image 1400 is shifted by −2*k pixels in the u direction and shifted by −j pixels in the v direction (that is, 2*k to the left and j pixels downward relative to the orientation shown in FIG. 14) relative to the reconstruction window 1302. As a result, a portion of the reference tile 1403 is shifted out of the reconstruction window 1302, while portions of adjacent tiles 1404, 1405, and 1406 of the reference image 1400 are shifted into the reconstruction window 1402. The pixels of the shifted reference image 1400 present in the reconstruction window 1302 thus are set as a reconstructed tile 1414 for the center tile position of the descendant image.

Figure 15:
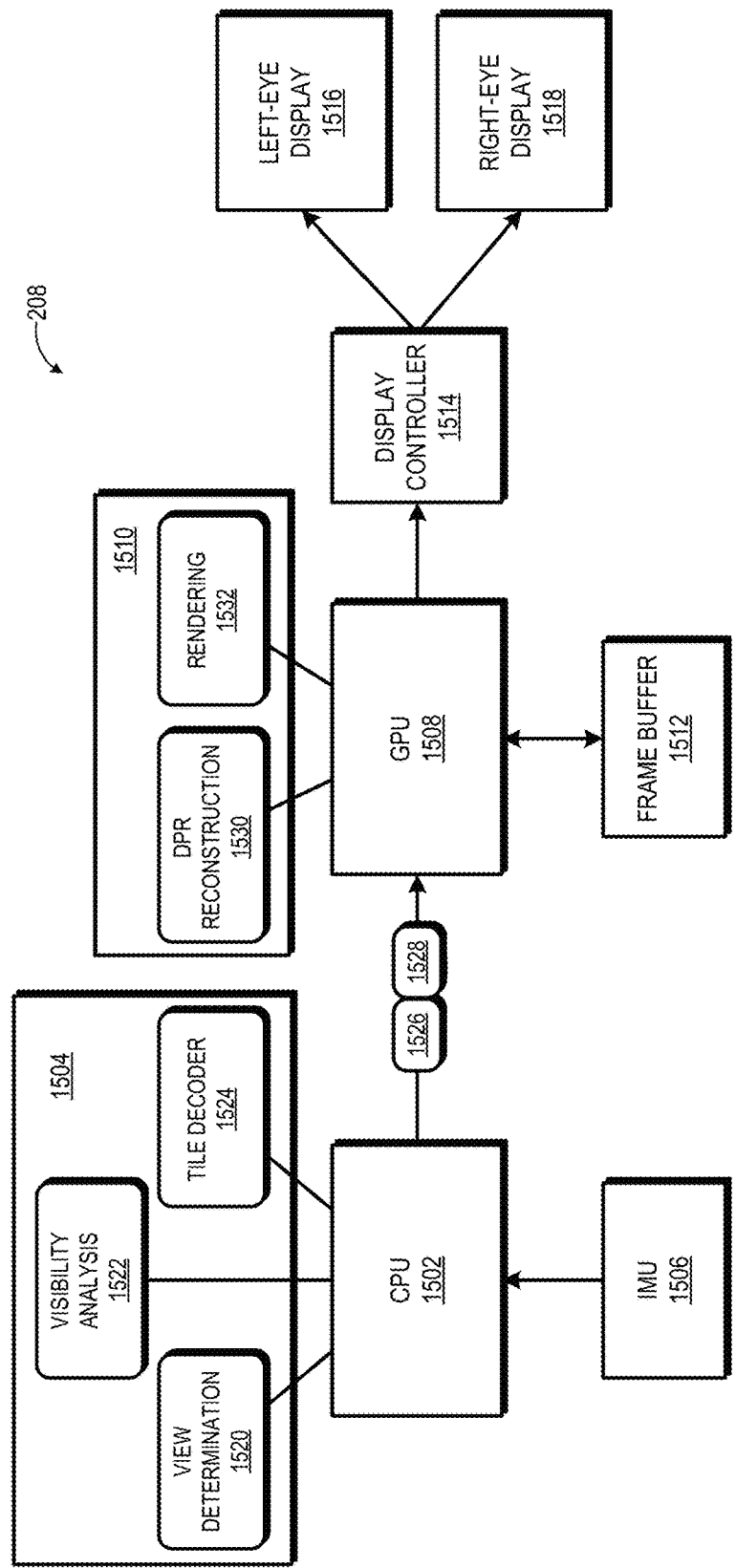
FIG. 15 is a diagram illustrating an example implementation of a lightfield decompression/rendering device of the display system of FIG. 1 in accordance with some embodiments.

FIG. 15 illustrates an example hardware implementation of the lightfield decompression/rendering component 208 in accordance with at least some embodiments. In the depicted example, the lightfield decompression/rendering component 208 includes a CPU 1502 having an interface coupled to a non-transitory computer-readable storage medium 1504 and an interface coupled to an inertial measurement unit (IMU) 1506, and interfaces coupled to one or both of the network 218 and the storage device 216 (not shown in FIG. 15). The lightfield decompression/rendering component 208 further includes a GPU 1508 having an interface coupled to the CPU 1502, an interface coupled to a non-transitory computer-readable storage medium 1510, an interface coupled to a frame buffer 1512, and an interface coupled to a display controller 1514. The display controller in turn is coupled to one or more display panels, such as a left-eye display panel 1516 and a right-eye display panel 1518 of a HMD device.

In at least one embodiment, the workloads of the lightfield decompression process and rendering process are split between the CPU 1502 and the GPU 1508. To illustrate, the computer-readable storage medium 1504 stores software in the form of executable instructions configured to manipulate the CPU 1502 identify and DCP-decode (as necessary) the lightfield tiles needed to render imagery representative of a particular view of a scene, while the computer-readable storage medium 1510 stores software in the form of executable instructions configured to manipulate the GPU 1508 to reconstruct any eliminated tiles needed to render the imagery, and then render the imagery using the accessed and reconstructed tiles. To illustrate, the CPU-side software can include a view determination module 1520 to determine the pose of the HMD device 210 (FIG. 2) via the IMU 1506 and from the pose determine the current view into the scene 213, a visibility analysis module 1522 to identify a set image tiles of the compressed lightfield 214 that are "visible" from the current view or otherwise are needed to render imagery of the scene 213 from the current view as described above, and a tile decoder module 1524 to access those tiles of the set that are present in the compressed lightfield 214, DCP decode them as necessary, and provide the present tiles (e.g., tile 1526) to the GPU 1508. For those tiles of the set that have been eliminated from the compressed lightfield 214, the tile decoder module 1524 manipulates the CPU 1502 to access the DDV for each eliminated tile of the set and provide the DDV (e.g., DDV 1528) to the GPU 1508.

The GPU-side software can include, for example, a DPR reconstruction module 1530 to use the DDV of a reference tile and ancestor tiles provided by the CPU 1502 to reconstruct an eliminated tile of the identified set of "visible" tiles using the processes described above, and further include a rendering module 1532 to generate imagery representing the current view of the scene 213 from the set of visible tiles accessed from the compressed lightfield 214 or reconstructed from reference images by the DPR reconstruction module 1530.

The DPR compression/decompression processes described above facilitate more efficient transmission, storage, and processing of lightfield data for scene view rendering. To illustrate, by reducing the total number of tiles that need to be decoded by the CPU and transferred to the GPU, the speed of the rendering process may be increased. Further, more of the lightfield may be stored in the frame buffer 1512 utilized by the GPU 1508 during this rendering process, and thus the GPU 1508 may spend less time re-decoding tiles that were previously evicted from the frame buffer 1512.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
a first storage device to store a first lightfield, the first lightfield comprising a two-dimensional array of images, each image comprising a corresponding two-dimensional array of image tiles;
a second storage device to store a second lightfield, the second lightfield comprising a compressed representation of the first lightfield; and
at least one first processor configured to selectively eliminate image tiles of images of the first lightfield from inclusion in the second lightfield based on identified redundancies between the eliminated image tiles and image tiles in the same tile positions of other images of the lightfield;
wherein the at least one first processor is configured to selectively eliminate image tiles by:
organizing the two-dimensional array of images of the first lightfield into a binary tree structure, with each node of the binary tree structure representing a corresponding image of the two-dimensional array of images; and
for each non-leaf node of the binary tree structure and for each image tile of the image at the non-leaf node, selectively eliminating a candidate image tile at the same tile position in an image at a descendant node of the non-leaf node from the second lightfield responsive to a disparity between the candidate image tile and the image tile of the image at the non-leaf node; and
wherein the at least one first processor is configured to determine the disparity by:
determining a first rate distortion resulting from replacement of the candidate image tile with the image tile of the image at the non-leaf node;
determining a second rate distortion resulting from encoding the candidate image tile;
including the candidate image tile in the second lightfield when the first rate distortion is not greater than the second rate distortion; and
eliminating the candidate image tile from the second lightfield when the first rate distortion is greater than the second rate distortion.

2. The system of claim 1, further comprising:
at least one second processor configured to render imagery using the second lightfield; and
at least one display panel configured to display the imagery.

3. The system of claim 2, further comprising:
a head mounted display device comprising the at least one display panel.

4. The system of claim 1, wherein the at least one first processor further is to encode the remaining image tiles of the second lightfield using a motion-search-based encoding process.

5. A system comprising:
a first storage device to store a first lightfield, the first lightfield comprising a two-dimensional array of images, each image comprising a corresponding two-dimensional array of image tiles;
a second storage device to store a second lightfield, the second lightfield comprising a compressed representation of the first lightfield; and
at least one first processor configured to:
selectively eliminate image tiles of images of the first lightfield from inclusion in the second lightfield based on identified redundancies between the eliminated image tiles and image tiles in the same tile positions of other images of the lightfield, wherein the at least one first processor is to selectively eliminate image tiles by:
organizing the two-dimensional array of images of the first lightfield into a binary tree structure, with each node of the binary tree structure representing a corresponding image of the two-dimensional array of images; and
for each non-leaf node of the binary tree structure and for each image tile of the image at the non-leaf node, selectively eliminating a candidate image tile at the same tile position in an image at a descendant node of the non-leaf node from the second lightfield responsive to a disparity between the candidate image tile and the image tile of the image at the non-leaf node;

determine a disparity derivative vector for the image tile of the image at the non-leaf node, the disparity derivative vector comprising one or more disparity derivatives specifying how to reconstruct an eliminated image tile of an image at a descendant node of the non-leaf node through corresponding shifting of the image at the non-leaf node in one or more dimensions as a function of a positional relationship between the image at the non-leaf node and the image at the descendant node in the two-dimensional array; and store the disparity derivative vector for the image tile to the second lightfield.

6. The system of claim 5, further comprising:

at least one second processor configured to:

identify a set of one or more image tiles of one or more images of the two-dimensional array for use in rendering imagery representing a view of a scene represented by the second lightfield; and responsive to determining the set of one or more image tiles comprises a first image tile eliminated from a first image in the second lightfield, reconstructing the first image tile using a second image in the second lightfield that is at an ancestor node of the node having the first image and using a disparity derivative vector stored for a second image tile of the second image that has a same tile position as the first image tile.

7. The system of claim 6, wherein the at least one second processor is configured to reconstruct the first image tile by:

shifting a portion of the second image including the second image tile and at least one other image tile of in one or more dimensions relative to a reconstruction window representing a boundary of the tile position of the first image tile based on the disparity derivative vector; and setting pixels contained within the reconstruction window after shifting the portion of the second image as a reconstructed representation of the first image tile.

8. The system of claim 6, wherein the at least one second processor further is configured to render the imagery using the set of one or more image tiles.

9. The system of claim 8, further comprising:

at least one display panel to display the imagery.

10. The system of claim 9, further comprising:

a head mounted display device comprising the at least one display panel.

11. The system of claim 5, wherein the at least one first processor further is to encode the remaining image tiles of the second lightfield using a motion-search-based encoding process.

12. A system comprising:

a storage device to store a compressed lightfield, the compressed lightfield comprising a compressed representation of a lightfield having a two-dimensional array of images, each image comprising a corresponding two-dimensional array of image tiles, and wherein at least a subset of the image tiles has been eliminated from the compressed lightfield; and at least one processor coupled to the storage device and configured to:

identify a set of one or more image tiles of one or more images of the two-dimensional array for use in rendering imagery representing a view of a scene represented by the compressed lightfield; and responsive to determining the set of one or more image tiles comprises a first image tile eliminated from a first image in the compressed lightfield, reconstructing the first image tile using a second image in the compressed lightfield identified as reference image for the first image and using a first disparity derivative vector accessed from the compressed lightfield for a second image tile of the second image that has a same tile position as the first image tile, the first disparity derivative vector comprising one or more disparity derivatives specifying how to reconstruct the first image tile through corresponding shifting of the second image in one more dimensions as a function of a positional relationship between first image and the second image in the two-dimensional array, wherein the at least one processor is configured to reconstruct the first image tile by:

shifting a portion of the second image including the second image tile and at least one other image tile of the second image in one or more dimensions relative to a reconstruction window representing a boundary of the tile position of the first image tile based on the first disparity derivative vector; and setting pixels contained within the reconstruction window after shifting the portion of the second image as a reconstructed representation of the first image tile.

13. The system of claim 12, wherein the at least one processor further is configured to:

responsive to determining the second image tile of the portion of the second image has been eliminated from the second image in the compressed lightfield, reconstructing the second image tile using a third image in the compressed lightfield identified as a reference image for the second image and using a second disparity derivative vector accessed from the compressed lightfield for a reference image tile of the third image that has a same tile position as the second image tile, the second disparity derivative vector comprising one or more disparity derivatives specifying how to reconstruct the second image tile through corresponding shifting of the third image in one more dimensions as a function of a positional relationship between the second image and the third image in the two-dimensional array.

14. The system of claim 12, wherein the at least one processor further is configured to render the imagery.

15. The system of claim 14, further comprising:

a head mounted display device having at least one display panel coupled to the at least one processor and configured to display the imagery.

16. A method comprising:

storing, at a first storage device, a first lightfield, the first lightfield comprising a two-dimensional array of images, each image comprising a corresponding two-dimensional array of image tiles; and compressing, by at least one first processor, the first lightfield to generate a second lightfield, the second lightfield comprising a compressed representation of the first lightfield, wherein compressing the first lightfield comprises selectively eliminating image tiles of images of the first lightfield from inclusion in the second lightfield based on identified redundancies between the eliminated image tiles and image tiles in the same tile positions of other images of the lightfield;
wherein selectively eliminating image tiles includes:
organizing the two-dimensional array of images of the first lightfield into a binary tree structure, with each node of the binary tree structure representing a corresponding image of the two-dimensional array of images; and
for each non-leaf node of the binary tree structure:
for each image tile of the image at the non-leaf node, selectively eliminating a candidate image tile at the same tile position in an image at a descendant node of the non-leaf node from the second lightfield responsive to a disparity between the candidate image tile and the image tile of the image at the non-leaf node; and
wherein determining the disparity includes:
determining a first rate distortion resulting from replacement of the candidate image tile with the image tile of the image at the non-leaf node;
determining a second rate distortion resulting from encoding the candidate image tile;
including the candidate image tile in the second lightfield when the first rate distortion is not greater than the second rate distortion; and
eliminating the candidate image tile from the second lightfield when the first rate distortion is greater than the second rate distortion.

17. The method of claim 16, further comprising:
determining, by the at least one first processor, a disparity derivative vector for the image tile of the image at the non-leaf node, the disparity derivative vector comprising one or more disparity derivatives specifying how to reconstruct an eliminated image tile of an image at a descendant node of the non-leaf node through corresponding shifting of the image at the non-leaf node in one or more dimensions as a function of a positional relationship between the image at the non-leaf node and the image at the descendant node in the two-dimensional array; and
storing the disparity derivative vector for the image tile to the second lightfield.

18. The method of claim 17, further comprising:
identifying, by at least one second processor a set of one or more image tiles of one or more images of the two-dimensional array for use in rendering imagery representing a view of a scene represented by the second lightfield; and
responsive to determining the set of one or more image tiles comprises a first image tile eliminated from a first image in the second lightfield, reconstructing, by the at least one second processor, the first image tile using a second image in the second lightfield that is at an ancestor node of the node having the first image and using a disparity derivative vector stored for a second image tile of the second image that has a same tile position as the first image tile.

19. The method of claim 18, wherein reconstructing the first image tile includes:
shifting a portion of the second image including the second image tile and at least one other image tile of in one or more dimensions relative to a reconstruction window representing a boundary of the tile position of the first image tile based on the disparity derivative vector; and
setting pixels contained within the reconstruction window after shifting the portion of the second image as a reconstructed representation of the first image tile.

20. The method of claim 18, further comprising:
rendering, by the at least one second processor, the imagery using the set of one or more image tiles.

21. The method of claim 20, further comprising:
providing the imagery for display at a display panel of a head mounted display device.

22. The method of claim 16, further comprising:
encoding the remaining image tiles of the second lightfield using a motion-search-based encoding process.

23. A method comprising:
storing, at a storage device, a compressed lightfield, the compressed lightfield comprising a compressed representation of a lightfield having a two-dimensional array of images, each image comprising a corresponding two-dimensional array of image tiles, and wherein at least a subset of the image tiles has been eliminated from the compressed lightfield; and
identifying, by at least one processor, a set of one or more image tiles of one or more images of the two-dimensional array for use in rendering imagery representing a view of a scene represented by the compressed lightfield; and
responsive to determining the set of one or more image tiles comprises a first image tile eliminated from a first image in the compressed lightfield, reconstructing, by the at least one processor, the first image tile using a second image in the compressed lightfield identified as reference image for the first image and using a first disparity derivative vector accessed from the compressed lightfield for a second image tile of the second image that has a same tile position as the first image tile, the first disparity derivative vector comprising one or more disparity derivatives specifying how to reconstruct the first image tile through corresponding shifting of the second image in one more dimensions as a function of a positional relationship between first image and the second image in the two-dimensional array, wherein reconstructing the first image tile comprises:
shifting a portion of the second image including the second image tile and at least one other image tile of the second image in one or more dimensions relative to a reconstruction window representing a boundary of the tile position of the first image tile based on the first disparity derivative vector; and
setting pixels contained within the reconstruction window after shifting the portion of the second image as a reconstructed representation of the first image tile.

24. The method of claim 23, further comprising:
responsive to determining the second image tile of the portion of the second image has been eliminated from the second image in the compressed lightfield, reconstructing the second image tile using a third image in the compressed lightfield identified as a reference image for the second image and using a second disparity derivative vector accessed from the compressed lightfield for a reference image tile of the third image that has a same tile position as the second image tile, the second disparity derivative vector comprising one or more disparity derivatives specifying how to reconstruct the second image tile through corresponding shifting of the third image in one more dimensions as a function of a positional relationship between the second image and the third image in the two-dimensional array.

25. The method of claim 23, further comprising:
rendering, by the at least one processor, the imagery using the set of one or more image tiles.

26. The method of claim 25, further comprising:
providing the imagery for display at a display panel of a head mounted display device.

* * * * *